United States Patent
Elshafie et al.

(10) Patent No.: US 12,464,548 B2
(45) Date of Patent: Nov. 4, 2025

(54) RATE SPLITTING MULTIPLE ACCESS FOR SIDELINK COMMUNICATION

(71) Applicant: QUALCOMM Incorporated, San Diego, CA (US)

(72) Inventors: Ahmed Elshafie, San Diego, CA (US); Ahmed Attia Abotabl, San Diego, CA (US); Marwen Zorgui, San Diego, CA (US); Ahmed Abdelaziz Ibrahim Abdelaziz Zewail, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 442 days.

(21) Appl. No.: 18/179,076

(22) Filed: Mar. 6, 2023

(65) Prior Publication Data
US 2024/0306169 A1    Sep. 12, 2024

(51) Int. Cl.
*H04W 72/40* (2023.01)
*H04W 72/232* (2023.01)

(52) U.S. Cl.
CPC ......... *H04W 72/40* (2023.01); *H04W 72/232* (2023.01)

(58) Field of Classification Search
CPC .. H04W 72/40; H04W 72/232; H04B 7/0456; H04B 7/026; H04L 5/0044; H04L 5/0053; H04L 5/0094
See application file for complete search history.

(56) References Cited

U.S. PATENT DOCUMENTS

| | | | |
|---|---|---|---|
| 12,245,247 B2* | 3/2025 | Abotabl | H04W 72/23 |
| 12,348,286 B2* | 7/2025 | Stoica | H04B 7/0456 |
| 2011/0159897 A1* | 6/2011 | Choi | H04W 52/243 455/501 |
| 2011/0195704 A1* | 8/2011 | Choi | H04L 5/14 455/450 |
| 2011/0235750 A1* | 9/2011 | Shin | H04B 7/0434 375/296 |
| 2012/0214497 A1* | 8/2012 | Shin | H04W 16/32 455/449 |
| 2013/0237210 A1* | 9/2013 | Kang | H04B 7/0617 455/422.1 |
| 2014/0056334 A1* | 2/2014 | Khina | H04L 25/0242 375/211 |
| 2014/0146756 A1* | 5/2014 | Sahin | H04L 1/1607 370/328 |

(Continued)

*Primary Examiner* — John D Blanton
(74) *Attorney, Agent, or Firm* — Patterson & Sheridan LLP

(57) ABSTRACT

Certain aspects of the present disclosure provide techniques for rate-splitting multiple access (RSMA) for sidelink communication. An example method include determining a set of resources, in a resource pool of one or more resource pools, to use for transmitting information to a group of receiver UEs (RX UEs), transmitting to the group of RX UEs an indication that the TX UE will transmit the information to the group of RX UEs using rate splitting multiple access (RSMA), and transmitting the information to the group of RX UEs in the set of resources using RSMA. Transmitting the information to the group using RSMA may include transmitting a common message including combined control information to the group of RX UEs using a first precoder and transmitting individual private data messages to each RX UE in the group of RX UEs using separate respective precoders different from the first precoder.

30 Claims, 13 Drawing Sheets

(56) References Cited

U.S. PATENT DOCUMENTS

| | | | |
|---|---|---|---|
| 2019/0097677 A1* | 3/2019 | Sen | H04J 13/18 |
| 2019/0253172 A1* | 8/2019 | Park | H04L 5/0026 |
| 2019/0260418 A1* | 8/2019 | Park | H04J 13/16 |
| 2019/0260419 A1* | 8/2019 | Park | H04L 1/0003 |
| 2019/0312691 A1* | 10/2019 | Park | H04L 5/0037 |
| 2021/0250957 A1* | 8/2021 | Roth-Mandut | H04W 28/26 |
| 2021/0282121 A1* | 9/2021 | Selvanesan | H04W 72/23 |
| 2022/0060925 A1* | 2/2022 | Kumar | H04W 28/0242 |
| 2022/0191725 A1* | 6/2022 | Ashraf | H04L 5/0053 |
| 2022/0287125 A1* | 9/2022 | Bathwal | H04L 1/0014 |
| 2022/0400475 A1* | 12/2022 | Suh | H04W 72/23 |
| 2023/0070589 A1* | 3/2023 | Elshafie | H04B 17/318 |
| 2023/0095483 A1* | 3/2023 | Back | H04W 92/18 370/328 |
| 2023/0132338 A1* | 4/2023 | Stoica | H04B 7/0456 375/267 |
| 2023/0247590 A1* | 8/2023 | Wu | H04W 74/0825 370/329 |
| 2023/0284253 A1* | 9/2023 | Wang | H04W 72/23 370/330 |
| 2023/0291630 A1* | 9/2023 | Hosseini | H04L 25/03834 |
| 2023/0309016 A1* | 9/2023 | Li | H04W 76/14 |
| 2023/0353325 A1* | 11/2023 | Dutta | H04L 5/0055 |
| 2023/0388045 A1* | 11/2023 | Khoshnevisan | H04L 1/0003 |
| 2023/0389017 A1* | 11/2023 | Khoshnevisan | H04W 72/1273 |
| 2023/0397208 A1* | 12/2023 | Khoshnevisan | H04L 1/0003 |
| 2023/0421213 A1* | 12/2023 | Khoshnevisan | H04B 7/0413 |
| 2023/0422254 A1* | 12/2023 | Khoshnevisan | H04L 1/0041 |
| 2024/0007254 A1* | 1/2024 | Li | H04L 5/0055 |
| 2024/0022368 A1* | 1/2024 | Khoshnevisan | H04L 5/0048 |
| 2024/0057099 A1* | 2/2024 | Abotabl | H04L 5/14 |
| 2024/0064603 A1* | 2/2024 | Esswie | H04W 40/04 |
| 2024/0089029 A1* | 3/2024 | Abotabl | H03M 13/09 |
| 2024/0089055 A1* | 3/2024 | Khoshnevisan | H04L 5/0044 |
| 2024/0089151 A1* | 3/2024 | Zewail | H04L 25/0224 |
| 2024/0107535 A1* | 3/2024 | Khoshnevisan | H04L 5/0094 |
| 2024/0114353 A1* | 4/2024 | Li | H04W 76/14 |
| 2024/0121050 A1* | 4/2024 | Zhang | H04L 1/1822 |
| 2024/0121605 A1* | 4/2024 | Khoshnevisan | H04W 12/06 |
| 2024/0121646 A1* | 4/2024 | Elshafie | H04W 24/10 |
| 2024/0121662 A1* | 4/2024 | Zewail | H04W 28/06 |
| 2024/0129926 A1* | 4/2024 | Elshafie | H04W 72/1273 |
| 2024/0154636 A1* | 5/2024 | Asterjadhi | H04B 1/3805 |
| 2024/0155713 A1* | 5/2024 | Naik | H04W 76/15 |
| 2024/0171363 A1* | 5/2024 | Abotabl | H04W 72/232 |
| 2024/0178933 A1* | 5/2024 | Zewail | H04B 7/0452 |
| 2024/0179696 A1* | 5/2024 | Zorgui | H04W 72/0453 |
| 2024/0187194 A1* | 6/2024 | Khoshnevisan | H04L 1/1607 |
| 2024/0195523 A1* | 6/2024 | Elshafie | H04L 1/1854 |
| 2024/0195528 A1* | 6/2024 | Elshafie | H04L 1/1671 |
| 2024/0204827 A1* | 6/2024 | Khoshnevisan | H04B 7/0413 |
| 2024/0205991 A1* | 6/2024 | Ansari | H04W 76/15 |
| 2024/0214787 A1* | 6/2024 | Gao | H04W 72/543 |
| 2024/0215038 A1* | 6/2024 | Elshafie | H04W 72/0453 |
| 2024/0224306 A1* | 7/2024 | Elshafie | H04W 76/14 |
| 2024/0236662 A1* | 7/2024 | Elshafie | H04W 72/02 |
| 2024/0275547 A1* | 8/2024 | Hirzallah | G01S 5/02 |
| 2024/0276420 A1* | 8/2024 | Hirzallah | H04W 64/00 |
| 2024/0284336 A1* | 8/2024 | Yang | H04W 52/0235 |
| 2024/0284481 A1* | 8/2024 | Dutta | H04L 5/0094 |
| 2024/0298173 A1* | 9/2024 | Asterjadhi | H04W 12/106 |
| 2024/0298238 A1* | 9/2024 | Karmi | H04W 40/12 |
| 2024/0298241 A1* | 9/2024 | Karmi | H04W 40/12 |
| 2024/0306021 A1* | 9/2024 | Hu | H04W 92/12 |
| 2024/0306169 A1* | 9/2024 | Elshafie | H04W 72/232 |
| 2024/0306198 A1* | 9/2024 | Yu | H04W 16/14 |
| 2024/0356679 A1* | 10/2024 | Zhou | H04L 5/0094 |
| 2024/0357429 A1* | 10/2024 | Manolakos | H02J 50/001 |
| 2024/0372670 A1* | 11/2024 | Guo | H04L 5/0033 |
| 2025/0024457 A1* | 1/2025 | Elshafie | H04W 72/23 |
| 2025/0063582 A1* | 2/2025 | Guo | H04L 5/001 |
| 2025/0088967 A1* | 3/2025 | Manolakos | H04W 52/0216 |
| 2025/0105982 A1* | 3/2025 | Zhou | H04L 5/0055 |
| 2025/0185068 A1* | 6/2025 | Noh | H04W 72/04 |
| 2025/0202563 A1* | 6/2025 | Elshafie | H04B 7/0695 |
| 2025/0219774 A1* | 7/2025 | Zheng | H04L 5/0035 |
| 2025/0220394 A1* | 7/2025 | Selvanesan | H04W 4/08 |
| 2025/0220678 A1* | 7/2025 | Abotabl | H04B 7/0617 |

* cited by examiner

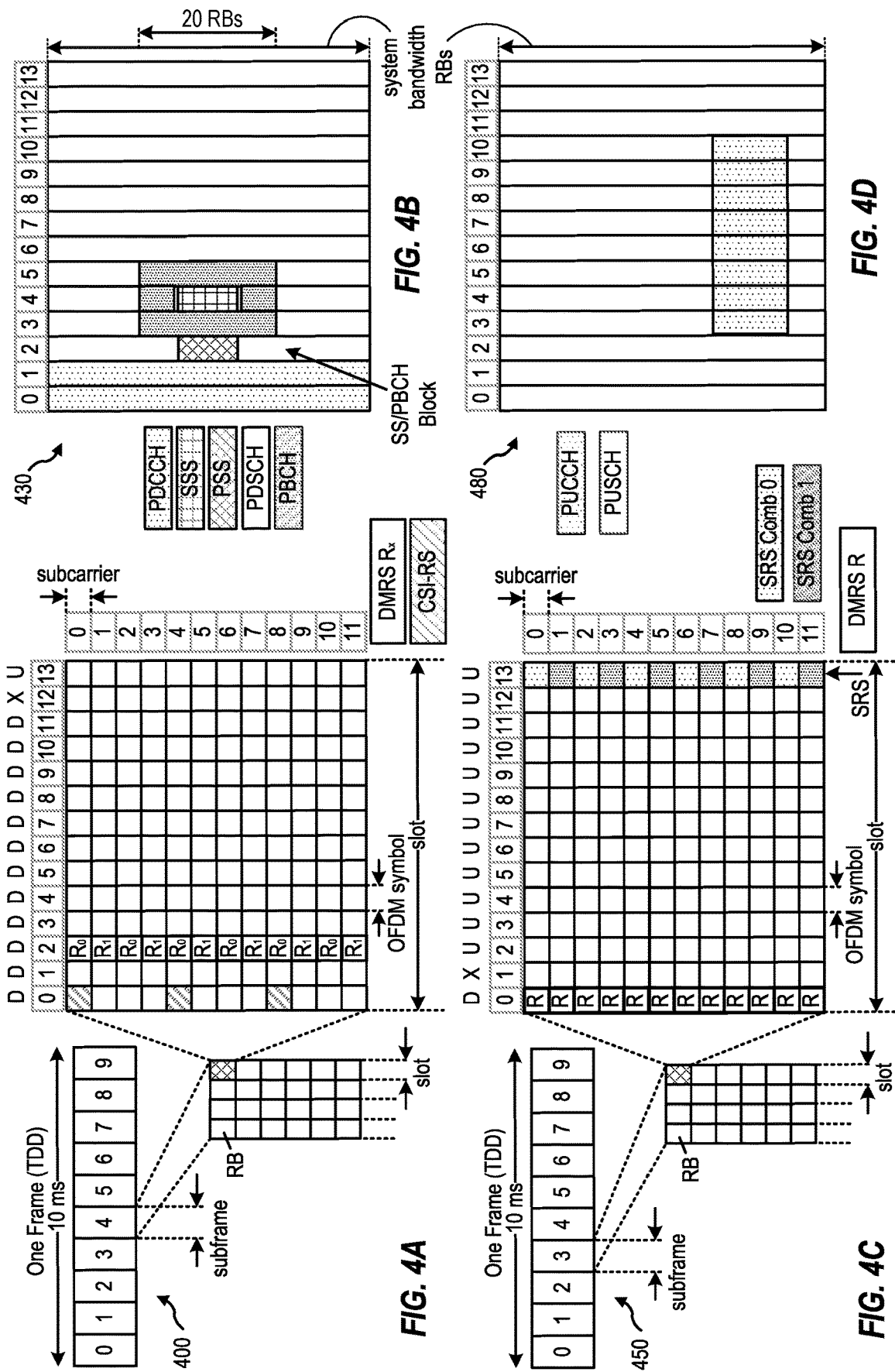

RATE SPLITTING MULTIPLE ACCESS FOR SIDELINK COMMUNICATION

BACKGROUND

Field of the Disclosure

Aspects of the present disclosure relate to wireless communications, and more particularly, techniques for rate splitting multiple access for sidelink communication.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a transmitter user equipment (TX UE). The method includes determining, according to a sidelink resource allocation mode, a set of resources, in a resource pool of one or more resource pools associated with the sidelink resource allocation mode, to use for transmitting information to a group of receiver UEs (RX UEs); transmitting to the group of RX UEs an indication that the TX UE will transmit the information to the group of RX UEs using rate splitting multiple access (RSMA); transmitting the information to the group of RX UEs in the set of resources using RSMA, wherein transmitting the information to the group using RSMA comprises: combining control information for different RX UEs in the group of RX UEs into a common message; transmitting, in the set of resources, the common message including the combined control information to the group of RX UEs using a first precoder; and transmitting, in the set of resources, individual private data messages to each RX UE in the group of RX UEs using separate respective precoders different from the first precoder.

Another aspect provides a method for wireless communications by a first receiver (RX) user equipment (UE). The method includes receiving, from a transmitter (TX) UE, an indication that the TX UE will transmit information to a group of RX UEs, including the first RX UE, using rate splitting multiple access (RSMA); receiving, in a set of resources in a resource pool of one or more resource pools associated with a sidelink resource allocation mode, the information from the TX UE using RSMA, wherein receiving the information comprises: receiving, in the set of resources, a common message including combined control information for individual RX UEs, including the first RX UE, in the group of RX UEs, and receiving, in the set of resources, at least one individual private data message intended for the first RX UE; decoding the common message using a first decoder; and decoding the at least one individual private data message using a second decoder.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Aspects of the present disclosure provide apparatuses, methods, processing systems, and computer-readable mediums for rate splitting multiple access for sidelink communication.

Rate-splitting techniques, such as Rate splitting multiple access (RSMA), have been shown to achieve higher capacity and may be a candidate for use in advanced systems, such as 6G and/or 5G-advanced. RSMA generally refers to a multiple access technique that allows multiple users to share frequency resources efficiently. RSMA allows multiple users to transmit data simultaneously over the same frequency band, but in a way that is different from conventional techniques, such as time division multiple access (TDMA) or frequency division multiple access (FDMA).

RSMA could be used for sidelink communication, for example, where individual users are user equipments (UEs). In such cases, a transmitter UE (TX-UE) may transmit, using RSMA, to a group of receive UEs (RX-UEs). In this context, the TX-UE may be a regular UE, a programmable logic control, a primary UE, etc. When using RSMA, individual messages intended for individual users (RX-UEs) are split into common and private parts (e.g., common messages and private messages). The common parts of individual messages may be concatenated into a common message, and encoded (using a common precoder) and modulated to a common stream. The private part of the individual messages may be separately encoded (using separate precoders) and modulated to private streams for transmission to their respective RX-UEs.

In some cases, control information for a group of RX UEs may be combined and transmitted to the group of RX UEs within a common message. The common message including the combined control information may include scheduling information for individual private data messages for each RX UE in the group of RX UEs. In some cases, using RSMA to combine the control information for a group of RX UEs and transmit the combined control information within one common message may allow the TX UE to conserve time-frequency resources within a wireless network since, in this case, the TX UE would not need to transmit a plurality of unicast control messages to schedule each of the RX UEs in the group of RX UEs. Additionally, transmitting the combined control information within one common message may also allow the TX UE to conserve power since the TX UE only needs to transmit one common message as compared to multiple unicast control messages for each of the RX UEs in the group of RX UEs.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
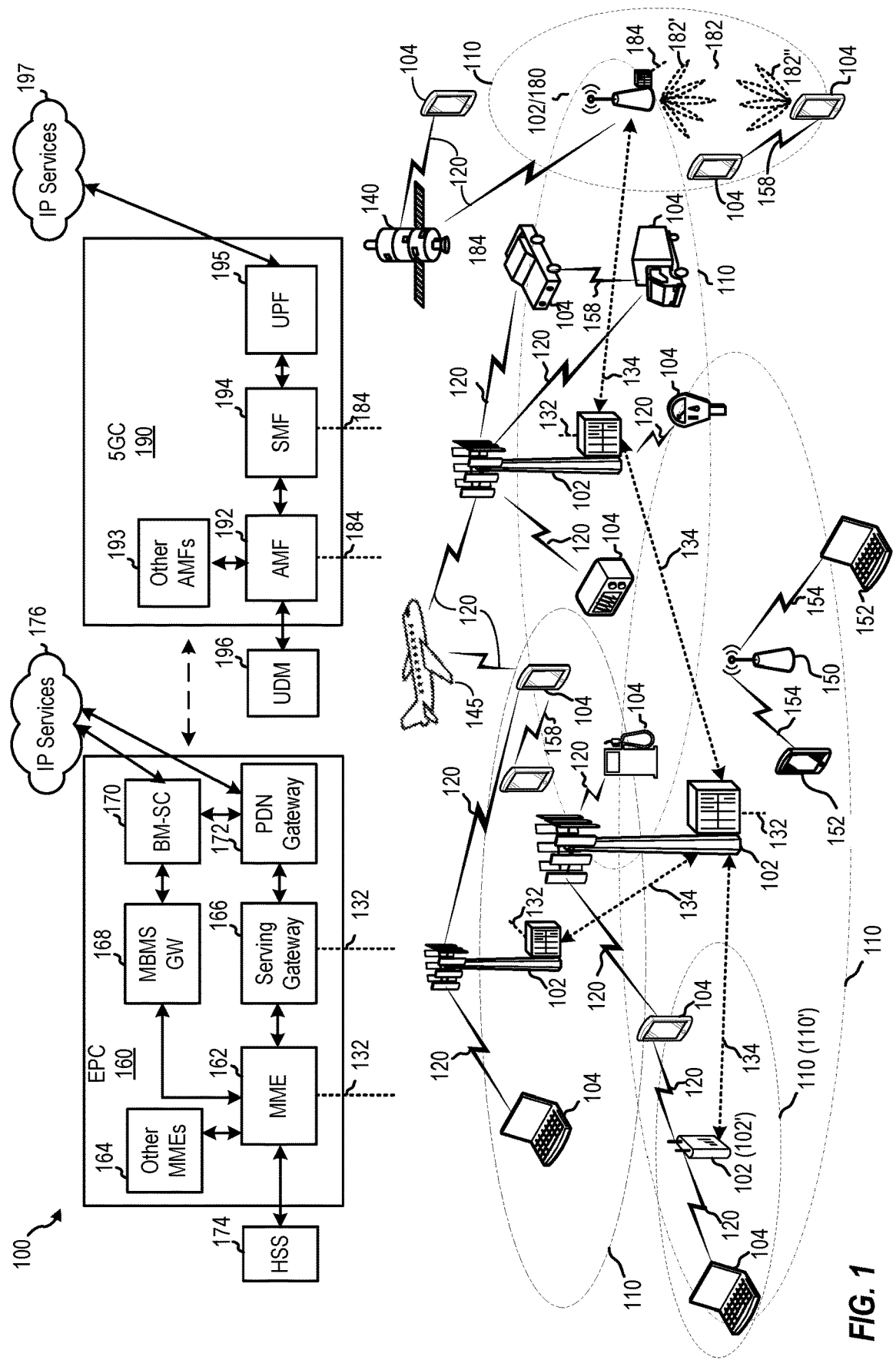
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
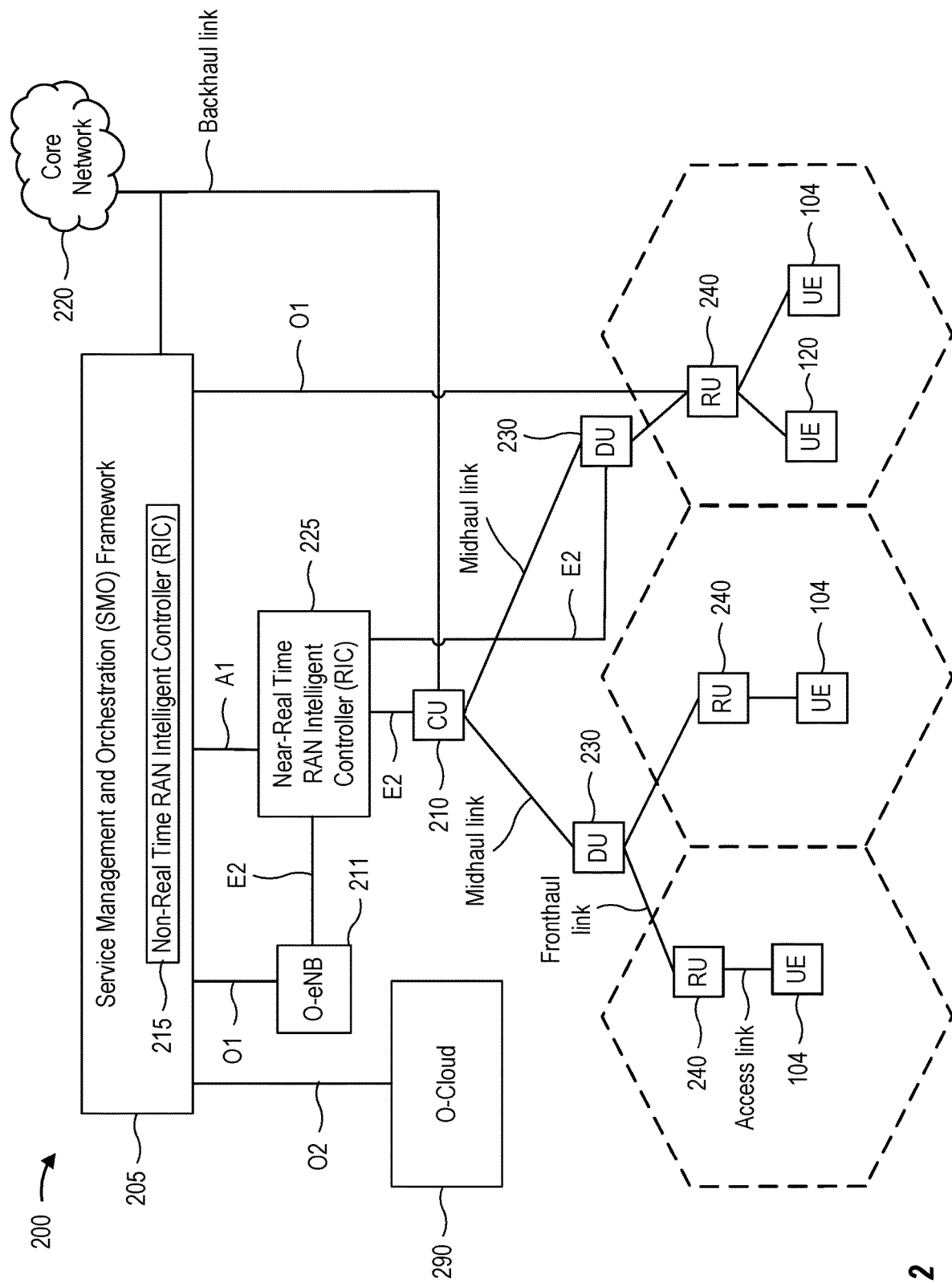
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUd 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
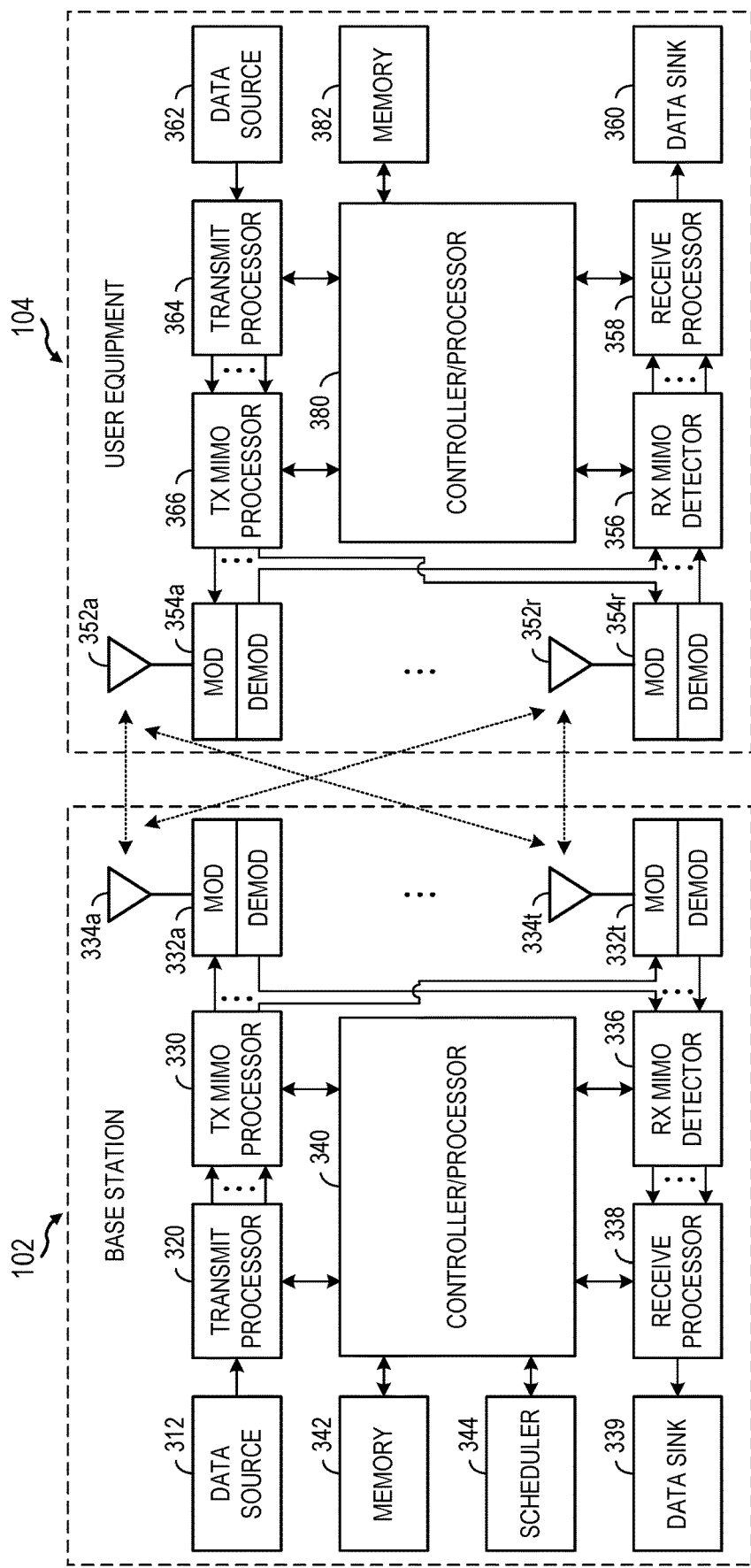
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Sidelink Communication

In some examples, two or more subordinate entities (e.g., UEs 104) may communicate with each other using sidelink signals. Real-world applications of such sidelink communications may include public safety, proximity services, UE-to-network relaying, vehicle-to-vehicle (V2V) communications, vehicle-to-everything (V2X), Internet of Everything (IoE) communications, IoT communications, mission-critical mesh, and/or various other suitable applications. Generally, a sidelink signal may refer to a signal communicated from one subordinate entity (e.g., UE 104) to another subordinate entity (e.g., another UE 104) without relaying that communication through the scheduling entity (e.g., UE 104 or BS 102), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as acknowledgement (ACK) and or negative ACK (NACK) information corresponding to transmissions on the PSSCH. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

Figure 5B:
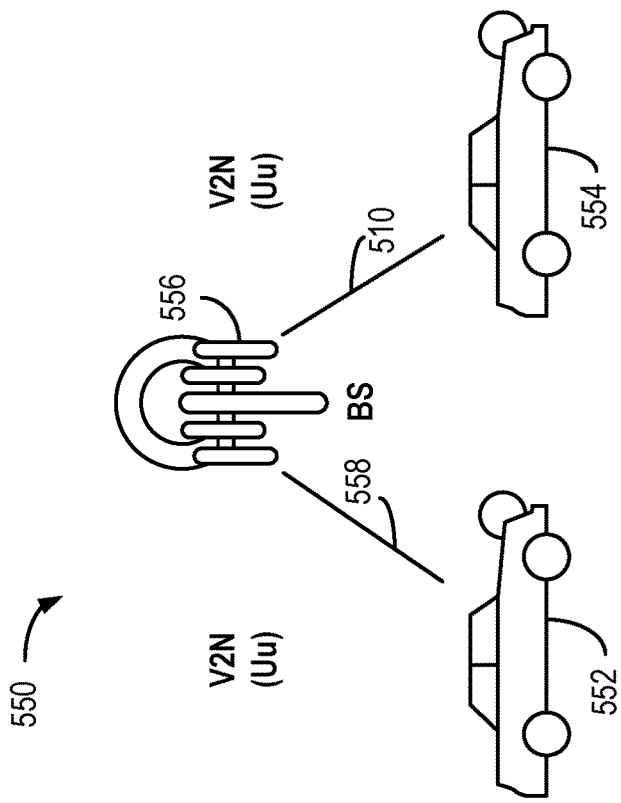
FIG. 5A and FIG. 5B show diagrammatic representations of example vehicle to everything (V2X) systems.
Figure 5A:
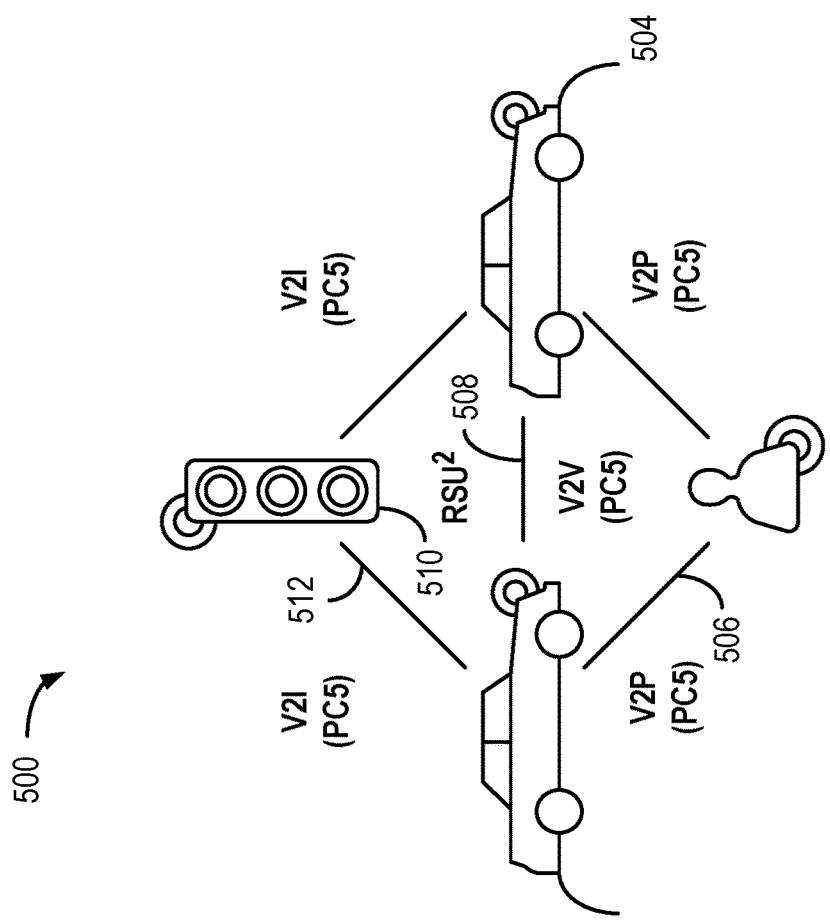

FIG. 5A and FIG. 5B show diagrammatic representations of example V2X systems, in accordance with some aspects of the present disclosure. For example, the vehicles shown in FIG. 5A and FIG. 5B may communicate via sidelink channels and may relay sidelink transmissions as described herein. V2X is a vehicular technology system that enables vehicles to communicate with the traffic and the environment around them using short-range wireless signals, known as sidelink signals.

The V2X systems provided in FIG. 5A and FIG. 5B provide two complementary transmission modes. A first transmission mode (also referred to as mode 4), shown by way of example in FIG. 5A, involves direct communications (for example, also referred to as sidelink communications) between participants in proximity to one another in a local area. A second transmission mode (also referred to as mode 3), shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 406 with an individual (V2P) (for example, via a UE) through a PC5 interface. Communications between the vehicles 502 and 504 may also occur through a PC5 interface 508. In a like manner, communication may occur from a vehicle 502 to other highway components (for example, highway component 510), such as a traffic signal or sign (V2I) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a BS (e.g., the BS 102), that sends and receives information to and from (for example, relays information between) vehicles 552, 554. The network communications through vehicle to network (V2N) links 558 and 560 may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Introduction to Sidelink Resource Allocation Modes

Sidelink communication may be performed using time-frequency resources allocated or selected from a resource pool. A resource pool can be thought of as a set of resources that are reserved for a particular use case or service. For example, a resource pool may be set up to support vehicle-to-vehicle (V2V) communication, or for multimedia sharing between devices. Resource pools can be pre-configured by the network operator, or they can be dynamically allocated based on the needs of the devices. Resource pools can be divided into fixed pools or dynamic pools, depending on whether the resources are allocated in advance or on-the-fly. Resource pools are an important concept in sidelink communication because they allow the network operator to control the allocation of resources, and to ensure that the resources are used efficiently and effectively. By defining different resource pools for different use cases, the network operator can allocate resources in a way that best meets the needs of the users and the application requirements.

The time-frequency resources for sidelink communications may be allocated using different sidelink allocation modes, such as sidelink resource allocation mode 1 (hereinafter "Mode 1") and sidelink resource allocation mode 2 (hereinafter "Mode 2'). For example, in Mode 1 operation, a network entity, such as a base station, indicates to a sidelink UE which resources to use to communicate (e.g., receive or transmit) a sidelink transmission. In Mode 2 operation, the sidelink UE identifies and selects the resources for the sidelink transmissions on its own (e.g., without the assistance of the network entity), for example, based on channel sensing.

In Mode 1 operation, the resources that the sidelink UE may use to transmit may be dynamically scheduled in a downlink control information (DCI) message, such as a DCI 3_0 message. The DCI message may include a time resource assignment, indicating which slot the sidelink transmit user equipment can use to transmit a sidelink transmission. The time resource assignment may indicate up to three sidelink slots, the first of which may be an initial transmission, and the second and third of which may be retransmissions. Additionally, the DCI message also includes a frequency resource assignment, indicating where in the frequency spectrum the sidelink UE can transmit the sidelink transmission.

In addition to the DCI message, sidelink control information (SCI) may also contain a time resource assignment. The SCI time resource assignment may be used by a sidelink user equipment to indicate to another sidelink user equipment (e.g., a receiving sidelink user equipment) which slot it will use to make the sidelink transmission.

In Mode 2 operation, as noted above, a sidelink transmitter UE determines which resources it will use for the sidelink transmission, for example, based on channel sensing. Once the sidelink transmitter UE determines which resources to use, the sidelink transmitter UE may include that information in the time resource assignment of the SCI to indicate to a sidelink receiver UE in which slots to expect to receive sidelink transmissions.

In addition to the time resource assignment, the SCI may also include a resource reservation period. The resource reservation period can be used to reserve multiple slots at configurable periodicities. The reserved slots may be used for new, future transmissions.

Introduction to Rate-Splitting Multiple Access (RSMA)

Figure 6:
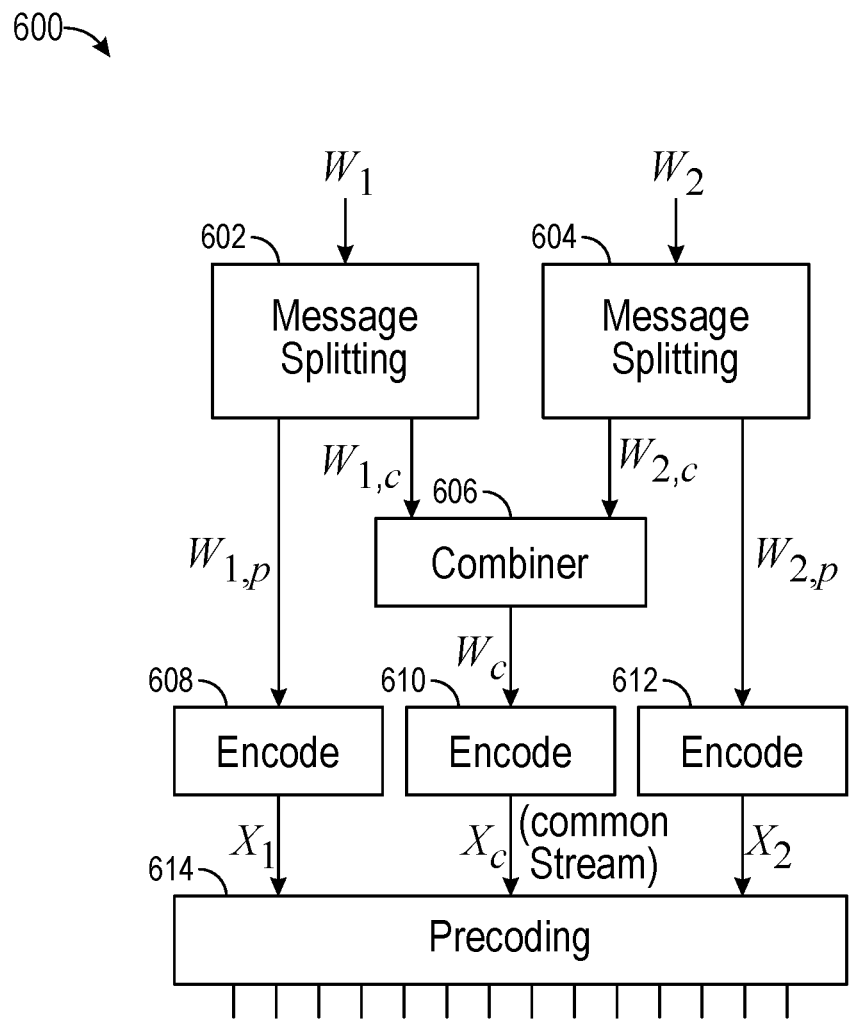
FIG. 6 depicts an example diagram illustrating techniques for transmitting using rate-splitting multiple access (RSMA), in accordance with certain aspects of the present disclosure.

FIG. 6 depicts an example diagram 600 illustrating a processing chain for transmitting to a group of receive UEs (RX-UEs) using rate-splitting multiple access (RSMA).

As noted above, in systems utilizing RSMA, individual messages ($W_1$ and $W_2$) intended for individual RX-UEs (UE1 and UE2) may be split into common and private parts and transmitted as common messages and private messages. As shown, individual message $W_1$ may be split, at 602, into a common part $W_{1,c}$ and a private part $W_{1,p}$, while individual message $W_2$ may be split, at 604, into a common part $W_{2,c}$ and a private part $W_{2,p}$. The common parts $W_{1,c}$ and $W_{2,c}$ may be combined (concatenated), at 606, into a common message, $W_c$.

The common message, $W_c$, may then be encoded and modulated, at 610, (e.g., where modulation is performed as part of the encoding block in the illustrated example) to generate a common stream, $X_c$, which may have one or more layers. The common stream may then be precoded, at 614, by a precoder $P_c$ and transmitted by transmit (TX) antennas.

The private parts $W_{1,p}$ and $W_{2,p}$ may be separately encoded and modulated, at 608 and 612 respectively, (e.g., where modulation is performed as part of the encoding block in the illustrated example) to generate private streams, $X_1$ and $X_2$, respectively, intended for their respective corresponding UEs. The private streams $X_1$ and $X_2$ may then be precoded separately, at 614, by separate precoders, $P_1$ and $P_2$, respectively, and transmitted by TX antennas.

In some cases, the precoders, $P_1$ and $P_2$, may be associated with narrower beams that the precoder $P_c$. Thus, the beamforming gain associated with precoders, $P_1$ and $P_2$ may be greater (e.g., from a UE perspective).

In some cases, after the common stream and private streams precoded, they may be transmitted by TX antennas. For example, one or more of the common stream and/or private streams may be transmitted from a single network entity (e.g., a TRP or gNB) or multiple network entities (e.g., multiple TRPs in a coordinated multipoint (CoMP) scenario).

As described above, the encoding blocks illustrated in FIG. 6 may perform encoding, modulation, and mapping of their respective inputs (e.g., $W_c$, $W_{1,p}$, or $W_{2,p}$) to one or more layers of their respective output streams (e.g., $X_c$, $X_1$, or $X_2$).

The precoded transmission, X (e.g., which includes the precoded output streams $X_c$, $X_1$, and $X_2$) may be represented by the following equation:

$$X = P_c X_c + P_1 X_1 + P_2 X_2.$$

From a receiver standpoint, each UE will receive the signal subject their own channel conditions. For example, UE1 will receive the RSMA transmission as:

$$Y_1 = H_1 P_c X_c + H_1 P_1 X_1 + H_1 P_2 X_2 + N_1,$$

where $N_1$ represents noise and/or interference associated with the transmission to UE1 and $H_1$ is the effective channel between UE1 and the transmitter. Similarly, UE2 will receive the RSMA transmission as:

$$Y_2 = H_2 P_c X_c + H_2 P_1 X_1 + H_2 P_2 X_2 + N_2,$$

where $N_2$ represents noise and/or interference and $H_2$ is the effective channel between UE2 and the transmitter.

Figure 7:
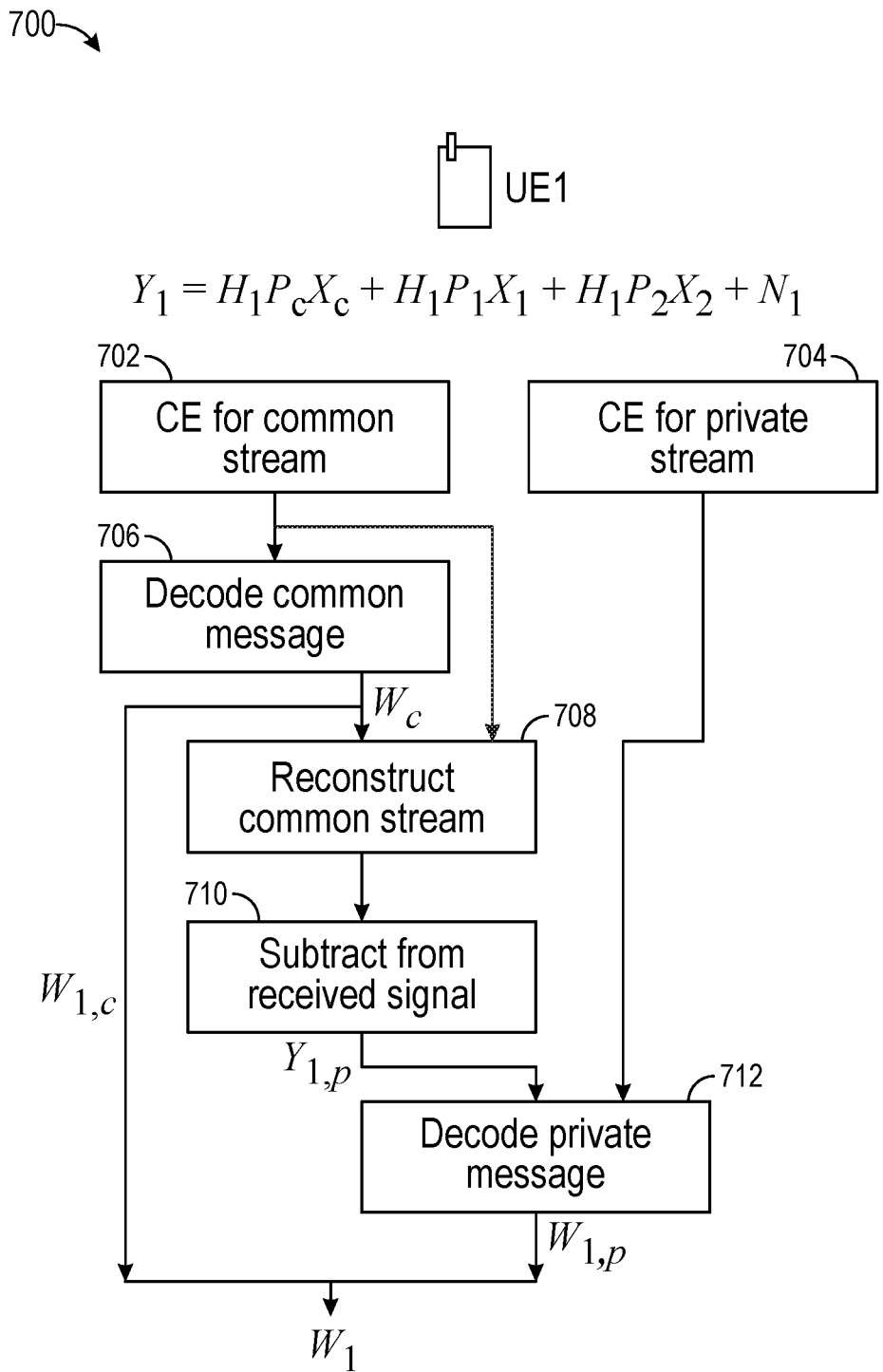
FIG. 7 depicts an example diagram illustrating techniques for processing an RSMA transmission, in accordance with certain aspects of the present disclosure.

FIG. 7 depicts an example diagram 700 illustrating a processing chain for an RX-UE for processing a received RSMA transmission. The example illustrates UE1 processing RSMA signal $Y_1$ as described above. While not shown, UE2 may process RSMA signal $Y_2$ in a similar manner. In some cases, the decode blocks illustrated in FIG. 7 may perform decoding, demodulation, and demapping.

As illustrated, UE1 may perform channel estimation (CE) for the common stream, at 702, and private streams, at 704. As noted above, the common message $W_c$ includes some part of the individual message for each UE (e.g., $W_1$ for UE1 and $W_2$ for UE2).

The UE1 may then use successive interference cancelation to decode the common message $W_c$, at 706. For example, UE1 may estimate the effective channel corresponding to the common stream ($H_1 P_c$) and decode the common message, $W_c$. The common message and the estimated effective channel may be used to reconstruct the common stream $X_c$ by re-encoding, as shown at 708. UE1 may then multiply the common stream by the estimated effective channel, which yields $H_1 P_c X_c$, which is then subtracted from the received signal, $Y_1$, at 710, resulting in $Y_{1,p}$, which may be represented (assuming idealistic channel estimation and successful decoding) by the following equation:

$$Y_{1,p} = Y_1 - H_1 P_c X_c = H_1 P_1 X_1 + H_1 P_2 X_2 + N_1.$$

UE1 may then use the estimated effective channel for the private stream (e.g., $H_1 P_1$), along with $Y_{1,p}$ to decode the private message, at 712, yielding $W_{1,p}$.

The decoded common message, $W_c$, (e.g., which was computed by concatenating the common part of individual message $W_1$, $W_{1,c}$, with the common part of individual message $W_2$, $W_{2,c}$) may be de-concatenated to yield the common part of individual message $W_1$, $W_{1,c}$. $W_{1,c}$, in addition to the decoded private message, $W_{1,p}$, make up the individual message, $W_1$, which was initially intended for UE1.

Aspects Related to Rate Splitting Multiple Access for Sidelink Communication

As noted above, RMSA has been shown to achieve higher capacity and may be a candidate for use in advanced systems, such as 6G and/or 5G-advanced. However, much of the focus of RMSA has been on the uplink-downlink user plane (Uu) interface. Accordingly, aspects of the present disclosure provide techniques for using RMSA for sidelink communication. In particular, in some cases, these techniques may involve the transmission of a multiple-transport block (TB) multiple access sidelink transmission using RMSA to a group of receiver user equipments (RX UEs). In some cases, the multi-TB transmission may include a first TB comprising a common message that includes control information for individual RX UEs in the group of RX UEs and one or more second TBs including individual private data messages for each RX UE in the group of UEs.

Figure 8:
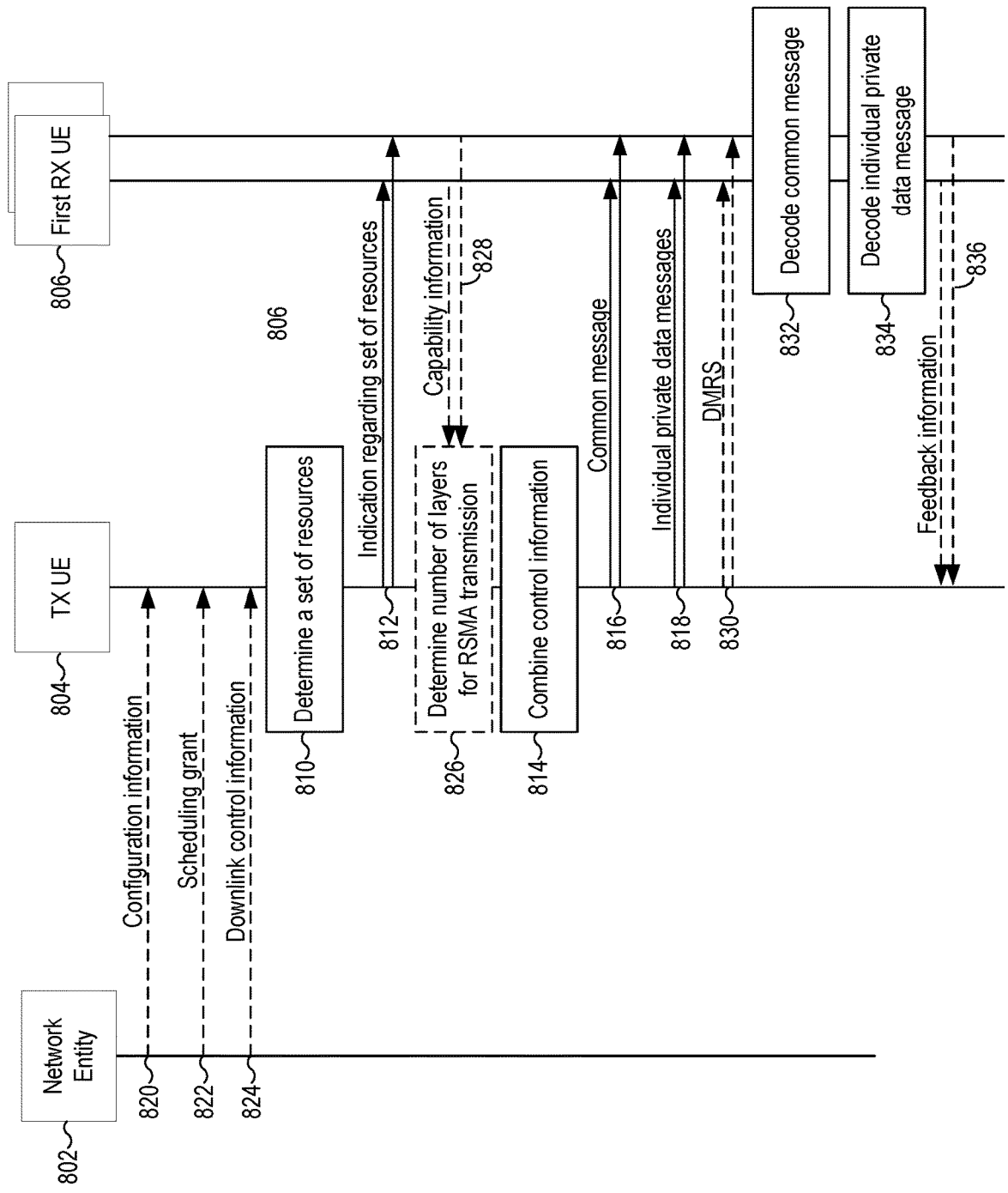
FIG. 8 depicts a process flow including operations for communication in a network, in accordance with certain aspects of the present disclosure.

Example Operations for Rate Splitting Multiple Access for Sidelink Communication FIG. 8 depicts a process flow including operations 800 for communication in a network between a network entity 802, a TX UE 804, and a first RX UE 806 of a group of RX UEs. Both of the TX UE 804 and first RX UE 806 may be sidelink UEs capable of communicating with each other using sidelink communications. In some cases, the TX UE 804 and first RX UE 806 may be examples of UE 104 depicted and described with respect to FIGS. 1 and 3. Further, the network entity 802 may be an example of a base station, such as a BS 102 of FIGS. 1 and 3 or a disaggregated base station as discussed with respect to FIG. 2.

As shown, operations 800 begin in step 810 with the TX UE 804 determining a set of resources to use for transmitting information to the group of RX UEs, including the first RX UE 806. The set of resources may comprise time-frequency resources allocated for sidelink communication and may be determined according to a particular sidelink resource allocation mode, such as Mode 1 or Mode 2. For example, when Mode 1 is used, determining the set of resources may be based on an indication received from the network entity 802 indicating the set of resources. In other cases, when Mode 2 is used, determining the set of resources comprises the TX UE 804 selecting the set of resources based on a channel sensing. In either case, the set of resources may be determined from a resource pool of one or more resource pools associated with the particular sidelink resource allocation mode being used. For example, in some cases, Mode 1 may be associated with a first set of resource pools while Mode 2 may be associated with a second set of resource pools.

As illustrated at 812, the TX UE 804 may transmit an indication regarding the set of resources to the group of RX UEs, including the first RX UE 806. For example, in some cases, the indication regarding the set of resources may indicate that the TX UE 804 will transmit information to the group of RX UEs, including the first RX UE 806, using RSMA. In some cases, the information may comprise control information and data for the group of RX UEs, including the first RX UE 806. In some cases, the indication regarding the set of resources may indicate the set of resources to receive the information. In some cases, the indication regarding the set of resources may be transmitted by the TX UE 804 to the group of RX UEs, including the first RX UE 806, in sidelink control information (SCI), such as a first stage SCI message (SCI-1), a second stage SCI message (SCI-2), or both.

Thereafter, the TX UE 804 may transmit the information to the group of RX UEs in the set of resources using RSMA. As shown in FIG. 8, transmitting the information to the group of RX UEs using RSMA may involve a number of steps. For example, as shown in step 814, the TX UE 804 combines control information for different RX UEs in the group of RX UEs, including the first RX UE 806, into a common message. In step 816, the TX UE 804 may then transmit, in the set of resources, the common message including the combined control information to the group of RX UEs, including the first RX UE 806, using a first precoder. In step 818, the TX UE 804 may then transmit, in the set of resources, individual private data messages to each RX UE in the group of RX UEs, including the first RX UE 806, using separate respective precoders different from the first precoder.

An example of this combining of control information into a common message and transmitting the common message separate from individual private data messages may be better understood in relation to FIG. 6. For example, in the context of FIG. 6, UE1 and UE2 may be examples of the first RX UE 806 of the group of RX UEs described with respect to FIG. 8. Accordingly, the TX UE 804 may obtain individual messages ($W_1$ and $W_2$) intended for individual RX UEs (UE1 and UE2). Individual message $W_1$ may be split (e.g., as shown at 602) into a common part $W_{1,c}$, including control information for UE1, and a private part $W_{1,p}$, including an individual private data message for UE1. Likewise, individual message $W_2$ may be split (e.g., as shown at 604) into a common part $W_{2,c}$, including control information for UE2, and a private part $W_{2,p}$, including an individual private data message for UE2.

Thereafter, the common parts $W_{1,c}$ and $W_{2,c}$, including the control information for UE1 and UE2, respectively, may be combined (concatenated) (e.g., as shown at 606 in FIG. 6 and described with respect to step 814 in FIG. 8) into a common message, $W_c$. Thereafter, the common message $W_c$ and the individual private data messages includes within private parts $W_{1,p}$ and $W_{2,p}$ may be separately encoded and modulated (e.g., as shown at 608, 610, and 612 described above) to generate private streams $X_1$ and $X_2$ and a common stream $X_c$. Thereafter, the common steam may be precoded using a first precoder (e.g., $P_c$) and private streams $X_1$ and $X_2$ may be precoded using separate respective precoders (e.g., $P_1$ and $P_2$, respectively) different from the first precoder (e.g., $P_c$).

As discussed above with respect to step 816, the TX UE 804 may then transmit the (encoded, modulated, and precoded) common message, including the combined control information, to the group of RX UEs (e.g., UE1 and UE2 in FIG. 6), including the first RX UE 806, using the first precoder (e.g., $P_c$) Additionally, as discussed above with respect to step 818 the TX UE 804 may transmit the individual private data messages to each RX UE (e.g., UE1 and UE1 in FIG. 6) in the group of RX UEs, including the first RX UE 806, using separate respective precoders (e.g., $P_1$ and $P_2$) different from the first precoder (e.g., $P_c$).

In some cases, the common message includes a specific common configuration for the individual private data messages. For example, in some cases, the combined control information included in the common message may include scheduling information scheduling the individual private data messages for each respective RX UE in the group of RX UEs, including the first RX UE 806. In some cases, the common message including the combined control information comprises one of a downlink control information (DCI) message, a sidelink control information (SCI) message, a second stage SCI message (SCI-2), or a first stage SCI message (SCI-1) and a second stage SCI message (SCI-2).

In some cases, the TX UE 804 may decide whether or not to transmit the information (e.g., control information and data) to the group of RX UEs 86 using RSMA based on various factors. For example, the TX UE 804 may decide to transmit the indication indicating that the TX UE 804 will transmit the information to the group of RX UEs, including the first RX UE 806, using RSMA based on at least one of (1) a priority associated with the information for transmission to the group of RX UEs, (2) a remaining PDB associated with the information for transmission to the group of RX UEs, (3) a quality of service (QoS) associated with the information for transmission to the group of RX UEs, or (4) one or more channel state information (CSI) reports received from one or more RX UEs in the group of RX UEs. In some cases, the indication indicating that the TX UE 804 will transmit the information to the group of RX UEs using RSMA may be transmitted in SCI or using one or more of layer 1 (e.g., DCI), layer 2 (e.g., media access control-control element (MAC-CE)), or layer 3 (e.g., radio resource control (RRC)) signaling.

In some cases, the network entity 802 may be configured to enable or disable RSMA in a particular sidelink resource allocation mode, such as Mode 1 and Mode 2. For example, as shown in step 820, the TX UE 804 may receive configuration information from the network entity 802. In some cases, the configuration information may indicate whether RSMA is enabled or disabled for the particular sidelink resource allocation mode.

In some cases, because resource pools may operate under either Mode 1 or Mode 2, when the configuration information indicates that RSMA is enabled, all resource pools of the one or more resource pools associated with the particular sidelink resource allocation mode may be configured for RSMA. Alternatively, when the configuration information indicates that RSMA is disabled, all resource pools of the one or more resource pools associated with the particular sidelink resource allocation mode may not be configured for RSMA. Instead, when disabled, these resource pools may be used for normal, non-RMSA transmissions (e.g., the control information for individual RX UEs in the group of RX UEs may not be combined and instead separately transmitted to the individual RX UEs in the group of RX UEs).

In some cases, the network entity 802 may allow regular transmissions (e.g., non-RSMA) only within the one or more resource pools, RSMA transmission only within the one or more resource pools. In other cases, the network entity 802 may allow both regular transmissions and RSMA transmissions at a time. For example, when the configuration information indicates that RSMA is enabled, in some cases, a first set of resource pools in the one or more resource pools may be configured for RSMA and a second set of resource pools in the one or more resource pools are not configured for RSMA. In some cases, if both regular transmissions and RSMA transmissions are allowed in the one or more resource pools, the TX UE 804 may have a choice of whether or not to use RSMA transmissions.

In some cases, the network entity 802 may indicate whether RSMA is enabled or disabled on a resource pool level. For example, in some cases, the configuration information received in step 820 may indicate, for each respective resource pool of the one or more resource pools, whether RSMA is enabled or disabled for that respective resource pool or whether some resources in that respective resource pool are configured for RSMA and some resources in that respective resource pool are not configured for RSMA. In some cases, when some resources in a respective resource pool are configured for RSMA and some resources in the respective resource pool are not configured for RSMA, the TX UE 804 may decide whether or not to use RSMA within that respective resource pool to transmit the information to the group of RX UEs, for example, using one or more of the factors described above.

As noted above, in some cases, determining the set of resources in step 810 of FIG. 8 may be based on an indication of the set of resources received from the network entity 802. For example, in some cases, the TX UE 804 may receive a scheduling grant from the network entity 802 indicating the set of resources. In some cases, the scheduling grant may comprise a dynamic grant (DG) that dynamically allocates the set of resources. In such cases, the scheduling grant may be received in step 822 in a downlink control information (DCI) message. In some cases, the scheduling grant may comprise a configured grant (CG) that allocates the set of resources in a semi-static manner. In such cases, the scheduling grant may be received in step 822 in a radio resource control (RRC) message.

As shown in step 824, the TX UE 804 may receive a DCI indicating whether the set of resources indicated in the scheduling grant are configured for RSMA, are not configured for RSMA (e.g., configured for regular, non-RSMA transmissions), or that some resources in the set of resource are configured for both RSMA and that some resources in the set of resources are not configured for RSMA. In some cases, when some resources in the set of resource are configured for both RSMA and some resources in the set of resources are not configured for RSMA, the TX UE 804 may decide whether or not to use RSMA to transmit the information to the group of RX UEs, for example, using one or more of the factors described above.

In some cases, when the scheduling grant of step 822 comprises a DG, the scheduling grant may be received within the DCI of step 824 together with the indication of whether or not the resources are scheduled for RSMA. In other words, steps 822 and 824 may be combined in this case. Alternatively, when the scheduling grant of step 822 comprises a CG, the TX UE 804 may receive the scheduling grant in step 822 in an RRC message and may also receive a separate DCI message in step 824 with the indication of whether or not the resources are scheduled for RSMA.

In some cases, the indication of whether or not the set of resources indicated in the grant are configured for RSMA may be implicitly provided rather than an explicit indication within the DCI. For example, in some cases, if the set of resources are scheduled or reserved within a particular time period in which RSMA is enabled or configured, the scheduling or reservation of the set of resources within this particular time period may indicate to the TX UE that the set of resources are configured for RSMA. In such cases, transmitting the indication in step 812 that the TX UE will transmit the information to the group of RX UEs using RSMA may be based on the reservation of the set of resources within the time period in which RSMA is enabled.

In some cases, a maximum number of layers for transmitting the common message may be configured and a maximum number of layers for transmitting the individual private data messages may be configured. In some cases, the maximum number of layers for transmitting the common message and the maximum number of layers for transmitting the individual private data messages may each be configured per resource pool of the one or more resource pools or per scheduling grant (e.g., a DG or CG that indicates the set of resources for transmitting the information to the group of RX UEs, including the first RX UE 806).

In some cases, the maximum number of layers for transmitting the common message and the maximum number of layers for transmitting the individual private data messages may be received in the configuration information in step 820. In other cases, the maximum number of layers for transmitting the common message and the maximum number of layers for transmitting the individual private data messages may be preconfigured in memory of the TX UE 804, for example, by a manufacturer or retailer of the TX UE 804.

In some cases, as shown in step 826, the TX UE 804 may determine a number of layers for transmitting an RSMA transmission, such as for the transmission of the common message in step 816 and transmission of the individual private data messages in step 818. For example, in step 826, the TX UE 804 may further determine a first number of layers for transmitting the common message based on the maximum number of layers for transmitting the common message. The TX UE 804 may then use the first number of layers to transmit the common message in step 816. Similarly, in step 826, the TX UE 804 may optionally determine a second number of layers for transmitting the individual private data messages based on the maximum number of layers for transmitting the individual private data messages. The TX UE 804 may then use the second number of layers to transmit the individual private data messages in step 818.

In some cases, determining the first number of layers and determining the second number of layers may be based on individual capability information from one or more RX UEs in the group of RX UEs, including the first RX UE 806. For example, as shown in step 828, the TX UE 804 may receive the individual capability information from the one or more RX UEs in the group of RX UEs. In some cases, in addition to or instead of receiving the individual capability information directly from the one or more RX UEs in the group of RX UEs, the one or more RX UEs in the group of RX UEs may transmit the individual capability information to the network entity 802 and the network entity 802 may transmit the individual capability information to the TX UE 804. In some cases, the TX UE 804 may receive the individual capability information in at least one of one or more RRC messages, one or more layer 1 (e.g., DCI) messages, one or more layer 2 (e.g., MAC-CE) messages, or one or more layer 3 (e.g., RRC) messages.

As noted above, in step 812, the TX UE 804 may transmit an indication regarding the set of resources to the group of RX UEs, including the first RX UE 806. In some cases, the indication regarding the set of resources may include an indication of the set of resources. The indication of the set of resources may indicate, for the common message and for the individual private data messages, at least one of: (1) a respective time domain resource allocation (TDRA), (2) a respective frequency domain resource allocation (FDRA), (3) a respective modulation and coding scheme (MCS), (4), a respective demodulation reference signal (DMRS) identifier, (5) a respective number of ports to be used for transmission, or (6) a respective redundancy version. As noted above, the TX UE 804 may transmit the indication regarding the set of resources, including the indication of the set of resources for the common message and for the individual private data messages, in SCI, such as SCI-1, SCI-2, or both.

As noted above, the set of resources determined in step 810 may be determined according to a sidelink resource allocation mode, such a Mode 1 (e.g., in which the set of resources are allocated by a network entity 802) or Mode 2 (e.g., in which the set of resources are determined without assistance from a network entity, for example, using channel sensing). In the case of Mode 1, as noted above, the TX UE 804 may receive a DCI message from the network entity 802 comprising a scheduling grant indicating the set of resources, for example, as discussed with respect to steps 822 and 824. For example, the DCI may indicate the configuration information for the common message and individual private data messages (e.g., TDRA, FDRA, MCS, etc.), discussed above. In other cases, when Mode 2 is used, the TX UE 804 may determine the configuration information for the common message and individual private data messages (e.g., TDRA, FDRA, MCS, etc.) itself, without the assistance of the network entity 802

In some cases, as shown in step 830, the TX UE 804 may transmit one or more demodulation reference signals (DMRS) to the group of RX UEs, including the first RX UE 806, in order to improve demodulation of the common message and the individual private data messages at the group of RX UEs, including the first RX UE 806. For example, in some cases, the TX UE 804 may transmit a first DMRS associated with the common message and at least a second DMRS associated with at least one of the individual private data messages.

In some cases, a DMRS identifier (ID) of the first DMRS associated with the common message may be different from a DMRS ID of the second DMRS associated with the at least one of the individual private data messages. For example, in some cases, the TX UE 804 may transmit the first DMRS based on a first DMRS ID and may transmit the second DMRS based on a second DMRS ID different from the first DMRS ID.

In some cases, the network entity 802 may configure a DMRS offset between the first DMRS ID and the second DMRS ID. For example, in some cases, the TX UE 804 may receive, from the network entity 802, a DMRS ID offset between the first DMRS ID and the second DMRS ID. In some cases, the DMRS ID offset may be received in the configuration information of step 820. In some cases, the DMRS ID offset may be indicated per resource pool of the one or more resource pools. In other words, the network entity 802 may indicate a respective DMRS ID offset for each resource pool of the one or more resource pools.

In some cases, a relative configuration of common DMRS (e.g., for the common message) from private DMRS (e.g., for the individual private data messages) may be indicated per resource pool. For example, in some cases, one or more tables may define the relative relation between the common DMRS and the private DMRS. In such cases, the TX UE 804 may determine at least one of the first DMRS ID or the second DMRS based on the one or more tables defining the relative relationship between the first DMRS ID and the second DMRS ID.

In some cases, a MAC-CE message may be transmitted by the network entity 802 to the TX UE 804, indicating a plurality of DMRS IDs and one of them may be selected by the TX UE 804. For example, in some cases, for Mode 1, the TX UE 804 may receive a DCI message from the network entity 802, such as the DCI discussed with respect to steps 822 and 824 that includes the scheduling grant indicating the set of resources. In some cases, the DCI may indicate at least one of the first DMRS ID or the second DMRSs from the plurality of DMRS IDs received in the MAC-CE. Thereafter, the UE may transmit an indication of the first DMRS ID and the second DMRS ID to the group of RX UEs within SCI, for example, within the indication regarding the set of resources in step 812 using SCI-1, SCI-2, or both.

In some cases, when Mode 2 is used, the TX UE 804 may, itself, select the first DMRS ID and the second DMRS ID from the plurality of DMRS IDs (e.g., without receiving the DCI indicating the first DMRS ID and second DMRS ID). The TX UE 804 may then transmit an indication of the first DMRS ID and the second DMRS ID to the group of RX UEs within SCI, for example, within the indication regarding the set of resources in step 812 using SCI-1, SCI-2, or both.

In some cases, in Mode 1, DMRS configurations for the common message and the individual private data messages may be received from the network entity 802. Thereafter, down-selection of parameters (e.g., the first DMRS ID and the second DMRS ID) may take place between the TX UE 804 and group of RX UEs using SCI-1, SCI-2, or L1/L2/L3 signaling, or a combination. For example, in some cases, the TX UE 804 may receive configuration information for the first DMRS and the second DMRS from the network entity 802. In some cases, this configuration information may comprise the configuration information received in step 820. Thereafter, the TX UE 804 may select the first DMRS ID and the second DMRS ID based on the configuration information. In some cases, selecting the first DMRS ID and the second DMRS ID may be based on at least one of stage 1 sidelink control information (SCI-1), second stage sidelink control information (SCI-2), layer 1 signaling, layer 2 signaling, or layer 3 signaling. The TX UE 804 may then transmit signaling to the group of RX UEs, including the first RX UE 806, indicating the first DMRS ID and the second DMRS ID, such as within the indication regarding the set of resources transmitted in step 812 in SCI-1, SCI-2, or both.

As described above, the first RX UE 806 may receive, in the set of resources determined in step 810, the common message in step 816, at least one individual private data message intended for the first RX UE 806 in step 818, and a first DMRS associated with the common message and a second DMRS associated with the at least one individual private data message. In some cases, the first RX UE 806 may use the first DMRS to demodulate the common message and may use the second DMRS to demodulate the at least one individual private data message.

Thereafter, as shown in step 832, the first RX UE 806 may decode the common message using a first decoder. The first RX UE 806 may also decode the at least one individual private data message using a second decoder, as shown in step 834. In some cases, the first decoder may correspond to the first precoder used to precode the common message. In other words, the first decoder may be configured to reverse or remove the precoding of the common message based on the first precoder. Similarly, the second decoder may correspond to the second precoder used to precode the at least one individual private data message. In other words, the second decoder may be configured to reverse or remove the precoding of the at least one individual private data message based on the second precoder.

In some cases, after decoding, RX UEs in the group of RX UEs, including the first RX UE 806, may need to transmit feedback information to indicate whether the common message and/or the individual private data messages have been successfully received and decoded. In some cases, the feedback information may include hybrid automatic repeat request (HARQ) acknowledgement (ACK) information. For example, in some cases, the feedback information may include a positive ACK indicating that the common message and/or the individual private data messages were successfully received and decoded. In other cases, the feedback information may include a negative ACK (NACK) indicating that the common message and/or the individual private data messages was not successfully decoded. In some cases, this feedback information may be transmitted on a feedback channel, known as a physical sidelink feedback channel (PSFCH).

In order to transmit feedback information on the PSFCH, a set of PSFCH resources can be directly decided or based on a mapping between PSSCH and the corresponding PSFCH resource. The mapping may be based on at least one of: (1) a starting sub-channel of PSSCH (sl-PSFCH-CandidateResourceType is configured as startSubCH) or the number of sub-channels in a PSSCH (sl-PSFCH-CandidateResourceType is configured as allocSubCH), (2) a slot containing PSSCH, (3) a source ID of the feedback information, or (4) a destination ID for the feedback information. In some cases, a number of available PSFCH resources may be equal to or greater than the number of UEs in groupcast option 2.

Accordingly, for example, in step 836, the TX UE 804 may receive, from the first RX UE 806 in the group of RX UEs, first feedback information associated with the common message and second feedback information associated with a first individual private data message of the individual private data messages.

In some cases, the first feedback information and the second feedback information may be transmitted using a single cyclic shift on a same resource block (RB) determined from PSFCH resource determination. In some cases, the single cyclic shift may represent two bits. For example, a first bit of the two bits may indicate the first feedback information and a second bit of the two bits may indicate the second feedback information.

In other cases, the first feedback information may be associated with a first cyclic shift and the second feedback information is associated with a second cyclic shift different from the first cyclic shift.

In some cases, the first feedback information and the second feedback information may be transmitted on two different physical resource blocks (PRBs) that are separated by a configured offset or based on configuration based on message type. For example, in some cases, the first feedback information may be received in a first PRB while the second feedback information may be received in a second PRB. In some cases, the first PRB may be offset from the second PRB based on a configured offset. In some cases, this offset may be configured by the network entity 802.

In some cases, the first PRB may be based on configuration information that indicates the first PRB based on a message type of the common message. Similarly, the second PRB may be based on configuration information that indicates the second PRB based on a message type of the first individual private data message. For example, in some cases, the TX UE 804 may transmit configuration information to the first RX UE 806 that indicates that, when a common message type is received, the first RX UE 806 should select the first PRB to transmit the first feedback information for the common message. Similarly, the configuration information may indicated that, when an individual private data message type is received, the first RX UE 806 should select the second PRB to transmit the second feedback information for the individual private data message.

In some cases, the first feedback information and the second feedback information may be transmitted using a same resources with two different power levels (e.g., similar to a non-orthogonal multiple access (NOMA) transmission). In some cases, the power levels may be defined per message type. For example, in some cases, the first feedback information for the common message may have a higher power than the second feedback information for the first individual private data message or vice versa.

In other words, for example, in some cases, the first feedback information and the second feedback information may be received in a same PRB. In such cases, the first feedback information may be received with a first power level while the second feedback information may be received with a second power level different from the first power level.

In some cases, the first feedback information is received in a first PSFCH occasion while the second feedback information may be received in a second PSFCH occasion different from the first PSFCH occasion. In some cases, a first offset between reception of the common message at the first RX UE 806 and the first PSFCH occasion may be based on a message type associated with the common message. Similarly, in some cases, a second offset between reception of the first individual private data message at the first RX UE 806 and the second PSFCH occasion may be based on a message type associated with the first individual private data message.

Figure 9:
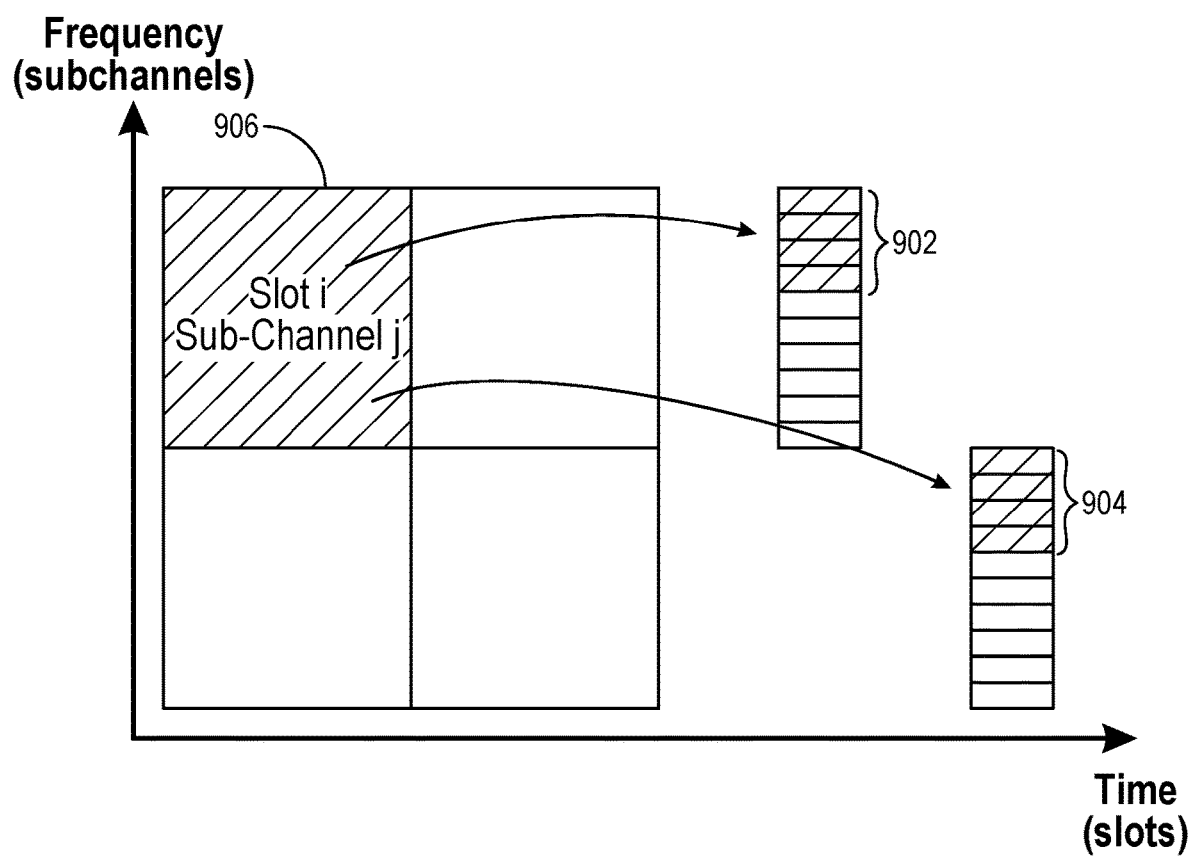
FIG. 9 illustrates different sets of physical resource blocks for the transmission of feedback information, in accordance with certain aspects of the present disclosure.

In some cases, the network entity 802 may assign different sets of PRBs for each of the common message and the individual private data messages. For example, as shown in FIG. 9, the network entity 802 may assign a first set of PRBs 902 within a PSFCH resource pool 906 for transmitting feedback information for common messages that include combined control information. Similarly, the network entity 802 may assign a second set of PRBs 904 within the PSFCH resource pool 906 for transmitting feedback information for individual private data messages. Accordingly, in some cases, the TX UE 804 may receive the first feedback information for the common message in the first set of PRBs 902 configured for feedback information for common messages. Additionally, in some cases, the TX UE 804 may receive the second feedback information for the first individual private data message in the second set of PRBs 904 configured for feedback information for individual private data messages.

In some cases, processing times for common messages may be different from individual private data messages since common messages may be received and decoded first by the group of RX UEs, including the first RX UE 806. Accordingly, feedback information for common messages may be sent first. As such, a PSSCH-to-PSFCH time gap for common messages may be different from that of individual private data messages. The PSSCH-to-PSFCH time gap may be a period of time between reception of a message, such as the common message or first individual private data message, and transmission of feedback for that received message. Accordingly, for example, in some cases, a PSSCH-to-PSFCH_common time gap and a PSSCH-to-PSFCH_private time gap may be defined and used when transmitting feedback information for common messages and individual private data messages. For example, in some cases, these time gaps may be defined within a wireless standard and may be defined per resource pool of the one or more resource pools. In some cases, the PSSCH-to-PSFCH-_common time gap and a PSSCH-to-PSFCH_private time gap may be at least two slots.

Accordingly, for example, the TX UE 804 may receive, from the first RX UE 806, the first feedback information associated with the common message based on a first PSSCH-to-PSFCH time gap configured for transmitting feedback information for the common message. The TX UE 804 may also receive, from the first RX UE 806, the second feedback information associated with the common message based on a second PSSCH-to-PSFCH time gap configured for transmitting feedback information for the individual private data messages. In some cases, the first PSSCH-to-PSFCH time gap and the second PSSCH-to-PSFCH time gap are configured per resource pool of the one or more resource pools.

Example Operations

Figure 10:
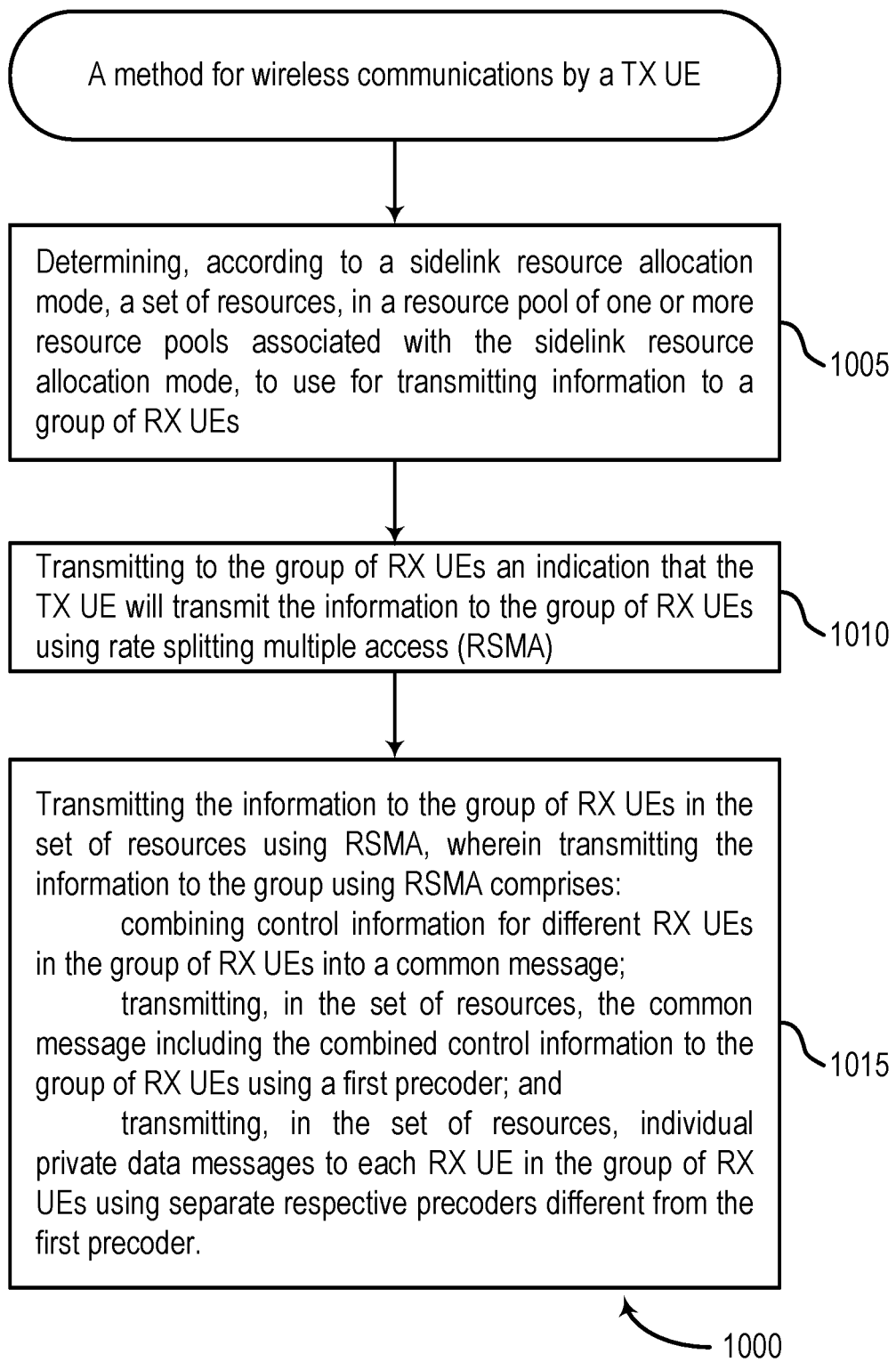
FIG. 10 depicts a method for wireless communications.

FIG. 10 shows an example of a method 1000 of wireless communication by a transmitter user equipment (TX UE), such as a UE 104 of FIGS. 1 and 3.

Method 1000 begins at step 1005 with determining, according to a sidelink resource allocation mode, a set of resources, in a resource pool of one or more resource pools associated with the sidelink resource allocation mode, to use for transmitting information to a group of receiver UEs (RX UEs). In some cases, the operations of this step refer to, or may be performed by, circuitry for determining and/or code for determining as described with reference to FIG. 12.

Method 1000 then proceeds to step 1010 with transmitting to the group of RX UEs an indication that the TX UE will transmit the information to the group of RX UEs using rate splitting multiple access (RSMA). In some cases, the operations of this step refer to, or may be performed by, circuitry for transmitting and/or code for transmitting as described with reference to FIG. 12.

Method 1000 then proceeds to step 1015 with transmitting the information to the group of RX UEs in the set of resources using RSMA, wherein transmitting the information to the group using RSMA comprises: combining control information for different RX UEs in the group of RX UEs into a common message, transmitting, in the set of resources, the common message including the combined control information to the group of RX UEs using a first precoder, and transmitting, in the set of resources, individual private data messages to each RX UE in the group of RX UEs using separate respective precoders different from the first precoder. In some cases, the operations of this step refer to, or may be performed by, circuitry for transmitting and/or code for transmitting and/or circuitry for combining and/or code for combining as described with reference to FIG. 12.

In some aspects, the combined control information included in the common message includes scheduling information scheduling the individual private data messages for each respective RX UE in the group of RX UEs.

In some aspects, the common message including the combined control information comprises one of a downlink control information (DCI) message, a sidelink control information (SCI) message, a second stage SCI message, or a first stage SCI message and a second stage SCI message.

In some aspects, the sidelink resource allocation mode comprises sidelink resource allocation mode 1; and determining the set of resources is based on an indication received from a network entity.

In some aspects, the sidelink resource allocation mode comprises sidelink resource allocation mode 2; and determining the set of resources comprises selecting the set of resources based on a channel sensing.

In some aspects, the indication that the TX UE will transmit the information to the group of RX UEs is based on at least one of: a priority associated with the information for transmission to the group of RX UEs; a remaining PDB associated with the information for transmission to the group of RX UEs; a quality of service (QoS) associated with the information for transmission to the group of RX UEs; or one or more channel state information (CSI) reports received from one or more RX UEs in the group of RX UEs.

In some aspects, the method 1000 further includes receiving configuration information from a network entity indicating whether RSMA is enabled or disabled for the sidelink resource allocation mode. In some cases, the operations of this step refer to, or may be performed by, circuitry for receiving and/or code for receiving as described with reference to FIG. 12.

In some aspects, when the configuration information indicates that RSMA is enabled, all resource pools in the one or more resource pools associated with the sidelink resource allocation mode are configured for RSMA; and when the configuration information indicates that RSMA is disabled, all resource pools in the one or more resource pools associated with the sidelink resource allocation mode are not configured for RSMA.

In some aspects, when the configuration information indicates that RSMA is enabled, a first set of resource pools in the one or more resource pools are configured for RSMA and a second set of resource pools in the one or more resource pools are not configured for RSMA.

In some aspects, determining the set of resources to use for transmitting information to a group of RX UEs is based on control information, received from a network entity, comprising a scheduling grant indicating the set of resources.

In some aspects, the method 1000 further includes receiving a downlink control information (DCI) message indicating whether the set of resources indicated in the scheduling grant are configured for RSMA, are not configured for RSMA, or that some resources in the set of resource are configured for both RSMA and that some resources in the set of resources are not configured for RSMA. In some cases, the operations of this step refer to, or may be performed by, circuitry for receiving and/or code for receiving as described with reference to FIG. 12.

In some aspects, the set of resources are reserved within a time period in which RSMA is enabled; and transmitting the indication that the TX UE will transmit the information to the group of RX UEs using RSMA is based on the reservation of the set of resources within the time period in which RSMA is enabled.

In some aspects, the method 1000 further includes receiving configuration information indicating, for each respective resource pool of the one or more resource pools, whether RSMA is enabled or disabled for that respective resource pool or whether some resources in that respective resource pool are configured for RSMA and some resources in that respective resource pool are not configured for RSMA. In some cases, the operations of this step refer to, or may be performed by, circuitry for receiving and/or code for receiving as described with reference to FIG. 12.

In some aspects, the method 1000 further includes receiving configuration information indicating at least one of a maximum number of layers for transmitting the common message or a maximum number of layers for transmitting the individual private data messages. In some cases, the operations of this step refer to, or may be performed by, circuitry for receiving and/or code for receiving as described with reference to FIG. 12.

In some aspects, the at least one of the maximum number of layers for transmitting the common message or the maximum number of layers for transmitting the individual private data messages is indicated per resource pool of the one or more resource pools or per resource grant.

In some aspects, the method 1000 further includes determining a first number of layers for transmitting the common message based on the maximum number of layers for transmitting the common message. In some cases, the operations of this step refer to, or may be performed by, circuitry for determining and/or code for determining as described with reference to FIG. 12.

In some aspects, the method 1000 further includes determining a second number of layers for transmitting the individual private data messages based on the maximum number of layers for transmitting the individual private data messages. In some cases, the operations of this step refer to, or may be performed by, circuitry for determining and/or code for determining as described with reference to FIG. 12.

In some aspects, the method 1000 further includes receiving individual capability information from one or more RX UEs in the group of RX UEs, wherein determining the first number of layers and determining the second number of layers is based further on the individual capability information received from the one or more RX UEs in the group of RX UEs. In some cases, the operations of this step refer to, or may be performed by, circuitry for receiving and/or code for receiving as described with reference to FIG. 12.

In some aspects, the sidelink resource allocation mode comprises a sidelink resource allocation mode 1 in which the set of resources are allocated by a network entity.

In some aspects, the method 1000 further includes receiving downlink control information (DCI), received from a network entity, comprising a scheduling grant indicating the set of resources. In some cases, the operations of this step refer to, or may be performed by, circuitry for receiving and/or code for receiving as described with reference to FIG. 12.

In some aspects, the method 1000 further includes transmitting an indication of the set of resources to the group of RX UEs indicating, for the common message and for the individual private data messages, at least one of a respective time domain resource allocation, a respective frequency domain resource allocation, a respective modulation and coding scheme (MCS), a respective demodulation reference signal (DMRS) identifier, a respective number of ports to be used for transmission, or a respective redundancy version. In some cases, the operations of this step refer to, or may be performed by, circuitry for transmitting and/or code for transmitting as described with reference to FIG. 12.

In some aspects, transmitting the indication of the set of resources comprises transmitting the indication of the set of resources in at least one of a first stage sidelink control information (SCI-1) message or a second stage sidelink control information message (SCI-2).

In some aspects, the sidelink resource allocation mode comprises a sidelink resource allocation mode 2 in which the set of resources are determined without assistance from a network entity.

In some aspects, the method 1000 further includes transmitting an indication of the set of resources to the group of RX UEs indicating, for the common message and for the individual private data messages, at least one of a respective time domain resource allocation, a respective frequency domain resource allocation, a respective modulation and coding scheme (MCS), a respective demodulation reference signal (DMRS) identifier, a respective number of ports to be used for transmission, or a respective redundancy version. In some cases, the operations of this step refer to, or may be performed by, circuitry for transmitting and/or code for transmitting as described with reference to FIG. 12.

In some aspects, transmitting the indication of the set of resources comprises transmitting the indication of the set of resources in at least one of a first stage sidelink control information (SCI-1) message or a second stage sidelink control information message (SCI-2).

In some aspects, the method 1000 further includes transmitting a first demodulation reference signal (DMRS) associated with the common message based on a first DMRS identifier (ID). In some cases, the operations of this step refer to, or may be performed by, circuitry for transmitting and/or code for transmitting as described with reference to FIG. 12.

In some aspects, the method 1000 further includes transmitting a second DMRS associated with at least one of the individual private data messages based on a second DMRS ID. In some cases, the operations of this step refer to, or may be performed by, circuitry for transmitting and/or code for transmitting as described with reference to FIG. 12.

In some aspects, the first DMRS ID associated with the common message is different from at least the second DMRS ID associated with the at least one of the individual private data messages.

In some aspects, the method 1000 further includes receiving, from a network entity, a DMRS ID offset between the first DMRS ID and the second DMRS ID, wherein the DMRS ID offset is indicated per resource pool of the one or more resource pools. In some cases, the operations of this step refer to, or may be performed by, circuitry for receiving and/or code for receiving as described with reference to FIG. 12.

In some aspects, the method 1000 further includes determining at least one of the first DMRS ID or the second DMRS based on one or more tables that define a relative relationship between the first DMRS ID and the second DMRS ID. In some cases, the operations of this step refer to, or may be performed by, circuitry for determining and/or code for determining as described with reference to FIG. 12.

In some aspects, the method 1000 further includes receiving a plurality of DMRS IDs in a media access control-control element (MAC-CE) from a network entity. In some cases, the operations of this step refer to, or may be performed by, circuitry for receiving and/or code for receiving as described with reference to FIG. 12.

In some aspects, the method 1000 further includes a scheduling grant indicating the set of resources, wherein the DCI indicates at least one of the first DMRS ID or the second DMRSs from the plurality of DMRS IDs. In some cases, the operations of this step refer to, or may be performed by, circuitry for a scheduling and/or code for a scheduling as described with reference to FIG. 12.

In some aspects, the method 1000 further includes selecting the first DMRS ID and the second DMRS ID from the plurality of DMRS IDs. In some cases, the operations of this step refer to, or may be performed by, circuitry for selecting and/or code for selecting as described with reference to FIG. 12.

In some aspects, the method 1000 further includes transmitting sidelink control information to at least one of the RX UEs in the group of RX UEs indicating the first DMRS ID associated with the common message and the second DMRS ID associated with the at least one of the individual private data messages. In some cases, the operations of this step refer to, or may be performed by, circuitry for transmitting and/or code for transmitting as described with reference to FIG. 12.

In some aspects, the method 1000 further includes receiving configuration information for the first DMRS and the second DMRS from a network entity. In some cases, the operations of this step refer to, or may be performed by, circuitry for receiving and/or code for receiving as described with reference to FIG. 12.

In some aspects, the method 1000 further includes selecting the first DMRS ID and the second DMRS ID based on the configuration information. In some cases, the operations of this step refer to, or may be performed by, circuitry for selecting and/or code for selecting as described with reference to FIG. 12.

In some aspects, the method 1000 further includes transmitting signaling to the group of RX UEs indicating the first DMRS ID and the second DMRS ID. In some cases, the operations of this step refer to, or may be performed by, circuitry for transmitting and/or code for transmitting as described with reference to FIG. 12.

In some aspects, selecting the first DMRS ID and the second DMRS ID is based on at least one of stage 1 sidelink control information (SCI-1), second stage sidelink control information (SCI-2), layer 1 signaling, layer 2 signaling, or layer 3 signaling.

In some aspects, the method 1000 further includes receiving, from a first RX UE in the group of RX UEs, first feedback information associated with the common message and receiving second feedback information associated with a first individual private data message of the individual private data messages. In some cases, the operations of this step refer to, or may be performed by, circuitry for receiving and/or code for receiving as described with reference to FIG. 12.

In some aspects, the first feedback information and the second feedback information are transmitted using a single cyclic shift on a same resource block (RB); the single cyclic shift represents two bits; a first bit of the two bits indicates the first feedback information; and a second bit of the two bits indicates the second feedback information.

In some aspects, the first feedback information is associated with a first cyclic shift; and the second feedback information is associated with a second cyclic shift different from the first cyclic shift.

In some aspects, the first feedback information is received in a first physical resource block (PRB); and the second feedback information is received in a second PRB.

In some aspects, the first PRB is offset from the second PRB based on a configured offset.

In some aspects, at least one of: the first PRB is based on configuration information that indicates the first PRB based on a message type of the common message; or the second PRB is based on configuration information that indicates the second PRB based on a message type of the first individual private data message.

In some aspects, the first feedback information and the second feedback information are received in a same physical resource block (PRB); the first feedback information is received with a first power level; and the second feedback information is received with a second power level different from the first power level.

In some aspects, the first feedback information is received in a first physical sidelink feedback channel (PSFCH) occasion; and the second feedback information is received in a second PSFCH occasion different from the first PSFCH occasion.

In some aspects, a first offset between reception of the common message and the first PSFCH occasion is based on a message type associated with the common message; and a second offset between reception of the first individual private data message and the second PSFCH occasion is based on a message type associated with the first individual private data message.

In some aspects, the first feedback information is received in a first set of physical resource block (PRB) configured for feedback information for common messages; and the second feedback information is received in a second set of PRBs configured for feedback information for the individual private data messages.

In some aspects, the first feedback information associated with the common message is received based on a first physical sidelink shared channel (PSSCH)-to-physical sidelink feedback channel (PSFCH) time gap configured for transmitting feedback information for the common message; and the second feedback information associated with the common message is received based on a second PSSCH-to-PSFCH time gap configured for transmitting feedback information for the individual private data messages.

In some aspects, the first PSSCH-to-PSFCH time gap and the second PSSCH-to-PSFCH time gap are configured per resource pool of the one or more resource pools.

Figure 12:
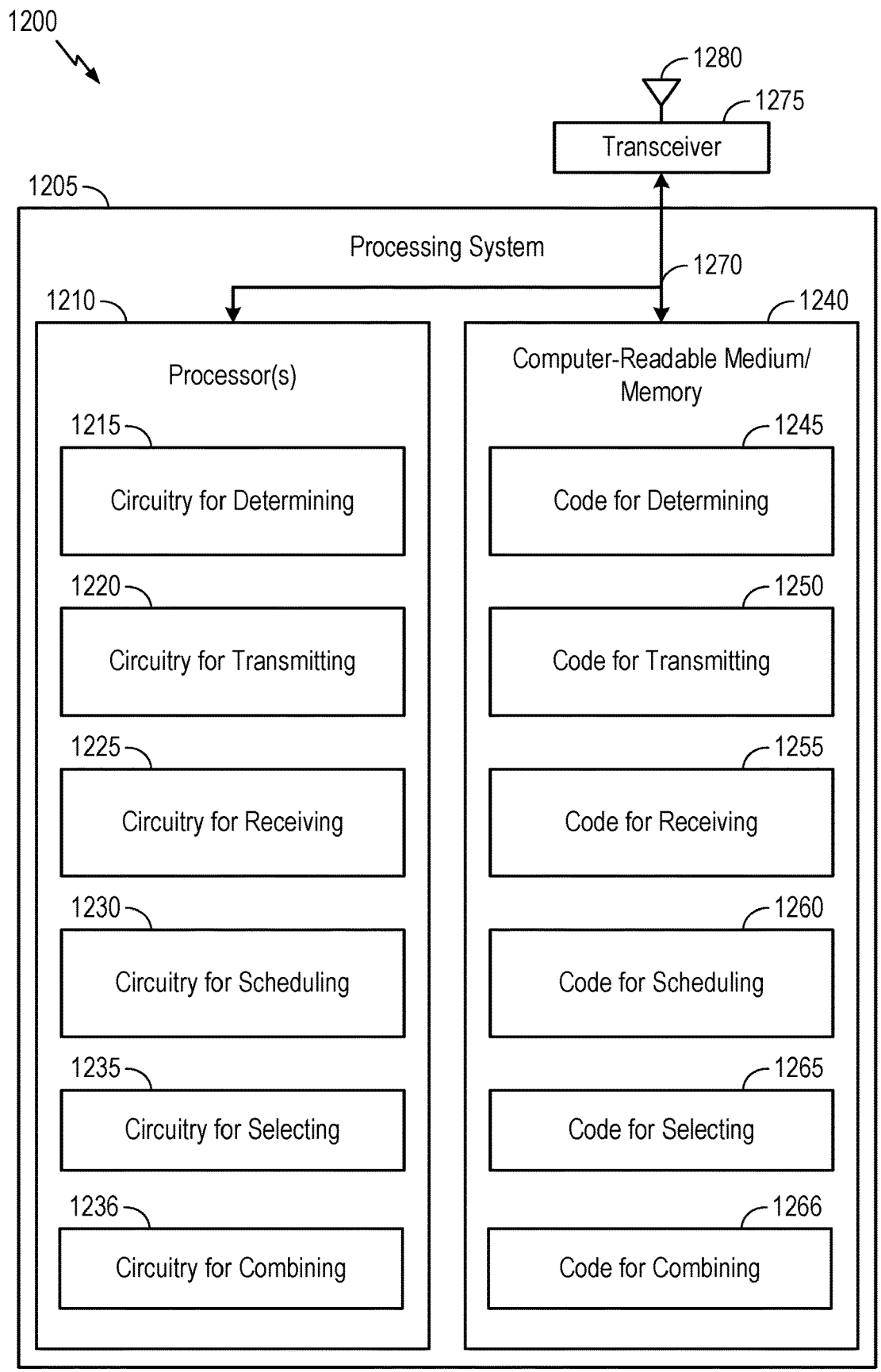
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Figure 11:
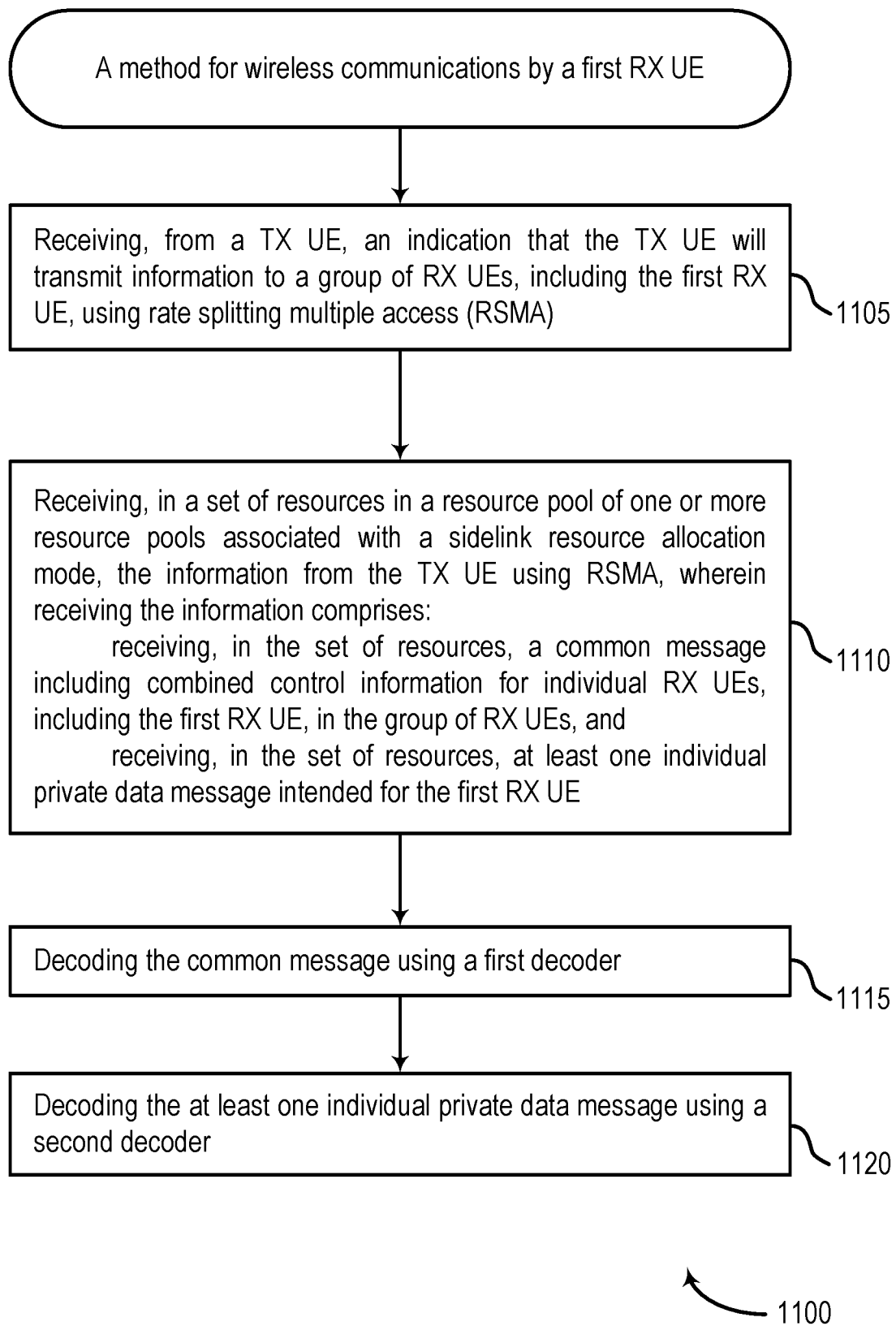
FIG. 11 depicts a method for wireless communications.

FIG. 11 shows an example of a method 1100 of wireless communications by a first receiver (RX) user equipment (UE), such as a UE 104 of FIGS. 1 and 3.

Method 1100 begins at step 1105 with receiving, from a transmitter (TX) UE, an indication that the TX UE will transmit information to a group of RX UEs, including the first RX UE, using rate splitting multiple access (RSMA). In some cases, the operations of this step refer to, or may be performed by, circuitry for receiving and/or code for receiving as described with reference to FIG. 13.

Method 1100 then proceeds to step 1110 with receiving, in a set of resources in a resource pool of one or more resource pools associated with a sidelink resource allocation mode, the information from the TX UE using RSMA, wherein receiving the information comprises: receiving, in the set of resources, a common message including combined control information for individual RX UEs, including the first RX UE, in the group of RX UEs, and receiving, in the set of resources, at least one individual private data message intended for the first RX UE. In some cases, the operations of this step refer to, or may be performed by, circuitry for receiving and/or code for receiving as described with reference to FIG. 13.

Method 1100 then proceeds to step 1115 with decoding the common message using a first decoder. In some cases, the operations of this step refer to, or may be performed by, circuitry for decoding and/or code for decoding as described with reference to FIG. 13.

Method 1100 then proceeds to step 1120 with decoding the at least one individual private data message using a second decoder. In some cases, the operations of this step refer to, or may be performed by, circuitry for decoding and/or code for decoding as described with reference to FIG. 13.

In some aspects, decoding the at least one individual private data message is based on results of decoding the common message.

In some aspects, the combined control information included in the common message includes scheduling information scheduling the at least one individual private data message.

In some aspects, the common message including the combined control information comprises one of a downlink control information (DCI) message, a sidelink control information (SCI) message, a second stage SCI message, or a first stage SCI message and a second stage SCI message.

In some aspects, the indication that the TX UE will transmit the information to the group of RX UEs is based on at least one of: a priority associated with the information for transmission to the group of RX UEs; a remaining PDB associated with the information for transmission to the group of RX UEs; a quality of service (QoS) associated with the information for transmission to the group of RX UEs; or one or more channel state information (CSI) reports associated with the first RX UE.

In some aspects, when RSMA is enabled, all resource pools in the one or more resource pools associated with the sidelink resource allocation mode are configured for RSMA; and when RSMA is disabled, all resource pools in the one or more resource pools associated with the sidelink resource allocation mode are not configured for RSMA.

In some aspects, when RSMA is enabled, a first set of resource pools in the one or more resource pools are configured for RSMA and a second set of resource pools in the one or more resource pools are not configured for RSMA.

In some aspects, the set of resources are reserved within a time period in which RSMA is enabled; and receiving the indication that the TX UE will transmit the information to the group of RX UEs using RSMA is based on the reservation of the set of resources within the time period in which RSMA is enabled.

In some aspects, the common message is transmitted using a first number of layers; and the at least one individual private data message is transmitted using a second number of layers; and at least one of the first number of layers or the second number of layers is based on individual capability information of the first RX UE.

In some aspects, the method 1100 further includes transmitting the individual capability information of the first RX UE to the TX UE. In some cases, the operations of this step refer to, or may be performed by, circuitry for transmitting and/or code for transmitting as described with reference to FIG. 13.

In some aspects, the sidelink resource allocation mode comprises a sidelink resource allocation mode 1 in which the set of resources are allocated by a network entity.

In some aspects, the method 1100 further includes receiving an indication of the set of resources from the TX UE indicating, for the common message and for the at least one individual private data message, at least one of a respective time domain resource allocation, a respective frequency domain resource allocation, a respective modulation and coding scheme (MCS), a respective demodulation reference signal (DMRS) identifier, a respective number of ports to be used for transmission, or a respective redundancy version. In some cases, the operations of this step refer to, or may be performed by, circuitry for receiving and/or code for receiving as described with reference to FIG. 13.

In some aspects, receiving the indication of the set of resources comprises receiving the indication of the set of resources in at least one of a first stage sidelink control information (SCI-1) message or a second stage sidelink control information message (SCI-2).

In some aspects, the sidelink resource allocation mode comprises a sidelink resource allocation mode 2 in which the set of resources are determined at the TX UE without assistance from a network entity.

In some aspects, the method 1100 further includes receiving an indication of the set of resources from the TX UE indicating, for the common message and for the at least one individual private data message, at least one of a respective time domain resource allocation, a respective frequency domain resource allocation, a respective modulation and coding scheme (MCS), a respective demodulation reference signal (DMRS) identifier, a respective number of ports to be used for transmission, or a respective redundancy version. In some cases, the operations of this step refer to, or may be performed by, circuitry for receiving and/or code for receiving as described with reference to FIG. 13.

In some aspects, receiving the indication of the set of resources comprises receiving the indication of the set of resources in at least one of a first stage sidelink control information (SCI-1) message or a second stage sidelink control information message (SCI-2).

In some aspects, the method 1100 further includes receiving a first demodulation reference signal (DMRS) associated with the common message based on a first DMRS ID. In some cases, the operations of this step refer to, or may be performed by, circuitry for receiving and/or code for receiving as described with reference to FIG. 13.

In some aspects, the method 1100 further includes receiving a second DMRS associated with at least one of the at least one individual private data message based on a second DMRS ID. In some cases, the operations of this step refer to, or may be performed by, circuitry for receiving and/or code for receiving as described with reference to FIG. 13.

In some aspects, the method 1100 further includes demodulating the common message based on the first DMRS and demodulating the at least one individual private data message based on the second DMRS. In some cases, the operations of this step refer to, or may be performed by, circuitry for demodulating and/or code for demodulating as described with reference to FIG. 13.

In some aspects, the first DMRS ID and the second DMRS ID are based on a DMRS ID offset configured per resource pool of the one or more resource pools.

In some aspects, a first DMRS identifier (ID) associated with the common message is different from at least a second DMRS ID associated with the at least one of the individual private data messages.

In some aspects, the method 1100 further includes receiving sidelink control information from the TX UE indicating the first DMRS ID associated with the common message and the second DMRS ID associated with the at least one individual private data message. In some cases, the operations of this step refer to, or may be performed by, circuitry for receiving and/or code for receiving as described with reference to FIG. 13.

In some aspects, the method 1100 further includes transmitting, to the TX UE, first feedback information associated with the common message and transmitting second feedback information associated with the at least one individual private data message. In some cases, the operations of this step refer to, or may be performed by, circuitry for transmitting and/or code for transmitting as described with reference to FIG. 13.

In some aspects, the first feedback information and the second feedback information are transmitted using a single cyclic shift on a same resource block (RB); the single cyclic shift represents two bits; a first bit of the two bits indicates the first feedback information; and a second bit of the two bits indicates the second feedback information.

In some aspects, the first feedback information is associated with a first cyclic shift; and the second feedback information is associated with a second cyclic shift different from the first cyclic shift.

In some aspects, the first feedback information is transmitted in a first physical resource block (PRB); and the second feedback information is transmitted in a second PRB.

In some aspects, the first PRB is offset from the second PRB based on a configured offset.

In some aspects, at least one of: the first PRB is based on configuration information that indicates the first PRB based on a message type of the common message; or the second PRB is based on configuration information that indicates the second PRB based on a message type of the at least one individual private data message.

In some aspects, the first feedback information and the second feedback information are transmitted in a same physical resource block (PRB); the first feedback information is transmitted with a first power level; and the second feedback information is transmitted with a second power level different from the first power level.

In some aspects, the first feedback information is transmitted in a first physical sidelink feedback channel (PSFCH) occasion; and the second feedback information is transmitted in a second PSFCH occasion different from the first PSFCH occasion.

In some aspects, a first offset between reception of the common message and the first PSFCH occasion is based on a message type associated with the common message; and a second offset between reception of the at least one individual private data message and the second PSFCH occasion is based on a message type associated with the at least one individual private data message.

In some aspects, the first feedback information is transmitted in a first set of physical resource block (PRB) configured for feedback information for common messages; and the second feedback information is transmitted in a second set of PRBs configured for feedback information for the individual private data messages.

In some aspects, the first feedback information associated with the common message is transmitted based on a first physical sidelink shared channel (PSSCH)-to-physical sidelink feedback channel (PSFCH) time gap configured for transmitting feedback information for the common message;

and the second feedback information associated with the common message is transmitted based on a second PSSCH-to-PSFCH time gap configured for transmitting feedback information for the individual private data messages.

In some aspects, the first PSSCH-to-PSFCH time gap and the second PSSCH-to-PSFCH time gap are configured per resource pool of the one or more resource pools.

Figure 13:
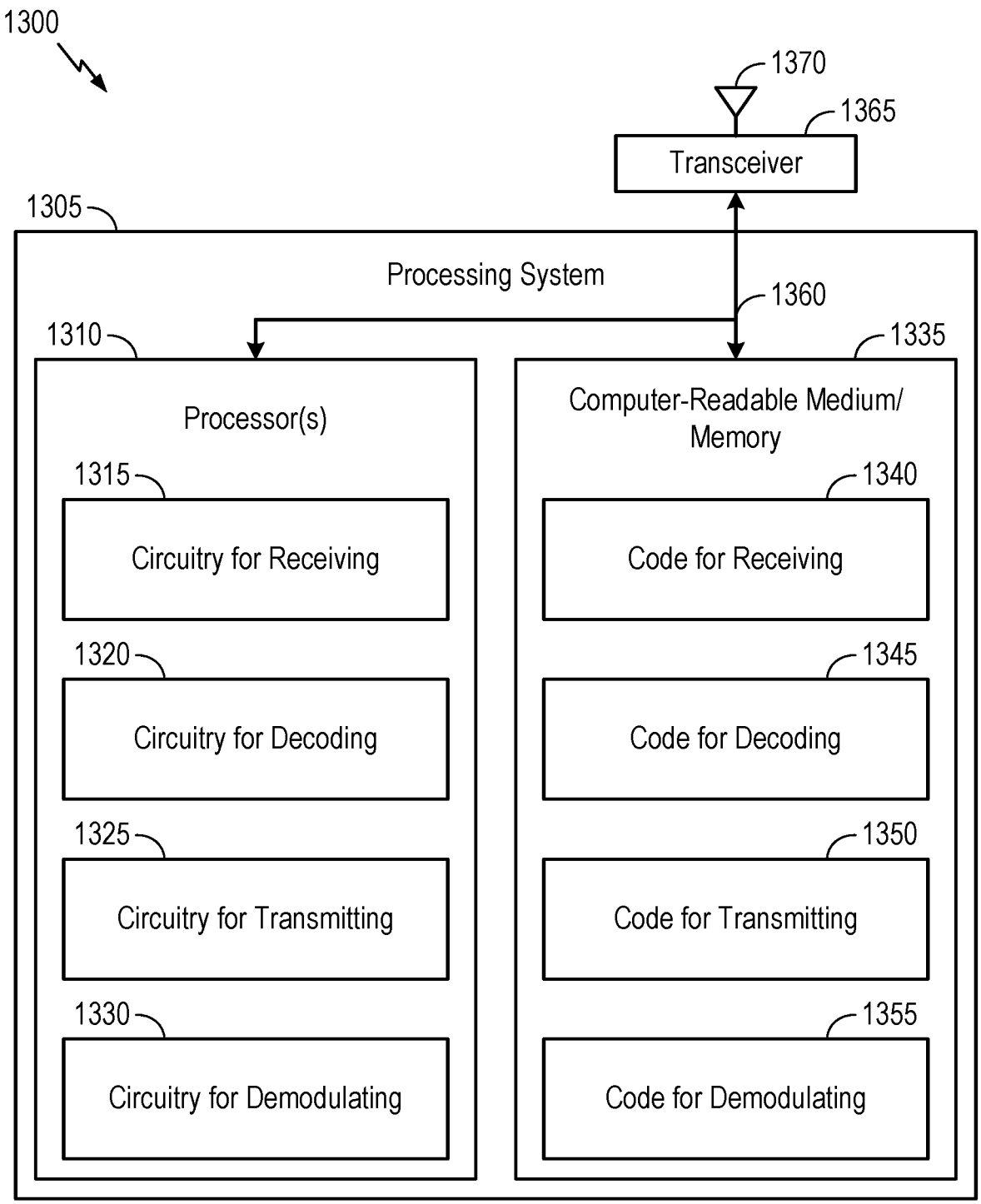
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Communications Device(s)

FIG. 12 depicts aspects of an example communications device 1200. In some aspects, communications device 1200 is a TX UE, such as UE 104 described above with respect to FIGS. 1 and 3 and/or the TX UE 804 described with respect to FIG. 8.

The communications device 1200 includes a processing system 1205 coupled to the transceiver 1275 (e.g., a transmitter and/or a receiver). The transceiver 1275 is configured to transmit and receive signals for the communications device 1200 via the antenna 1280, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1240 via a bus 1270. In certain aspects, the computer-readable medium/memory 1240 is configured to store instructions (e.g., computer-executable code) that when executed by the one or more processors 1210, cause the one or more processors 1210 to perform the method 1000 described with respect to FIG. 10, or any aspect related to it; and the method 1100 described with respect to FIG. 11, or any aspect related to it. Note that reference to a processor performing a function of communications device 1200 may include one or more processors 1210 performing that function of communications device 1200.

In the depicted example, computer-readable medium/memory 1240 stores code (e.g., executable instructions), such as code for determining 1245, code for transmitting 1250, code for receiving 1255, code for a scheduling 1260, code for selecting 1265, and code for combining 1266. Processing of the code for determining 1245, code for transmitting 1250, code for receiving 1255, code for a scheduling 1260, code for selecting 1265, and code for combining 1266 may cause the communications device 1200 to perform the method 1000 described with respect to FIG. 10, or any aspect related to it; and the method 1100 described with respect to FIG. 11, or any aspect related to it.

The one or more processors 1210 include circuitry configured to implement (e.g., execute) the code stored in the computer-readable medium/memory 1240, including circuitry such as circuitry for determining 1215, circuitry for transmitting 1220, circuitry for receiving 1225, circuitry for a scheduling 1230, circuitry for selecting 1235, and circuitry for combining 1236. Processing with circuitry for determining 1215, circuitry for transmitting 1220, circuitry for receiving 1225, circuitry for a scheduling 1230, circuitry for selecting 1235, and circuitry for combining 1236 may cause the communications device 1200 to perform the method 1000 described with respect to FIG. 10, or any aspect related to it; and the method 1100 described with respect to FIG. 11, or any aspect related to it.

Various components of the communications device 1200 may provide means for performing the method 1000 described with respect to FIG. 10, or any aspect related to it; and the method 1100 described with respect to FIG. 11, or any aspect related to it. For example, means for transmitting, sending or outputting for transmission may include transceivers 354 and/or antenna(s) 352 of the UE 104 illustrated in FIG. 3 and/or the transceiver 1275 and the antenna 1280 of the communications device 1200 in FIG. 12. Means for receiving or obtaining may include transceivers 354 and/or antenna(s) 352 of the UE 104 illustrated in FIG. 3 and/or the transceiver 1275 and the antenna 1280 of the communications device 1200 in FIG. 12.

FIG. 13 depicts aspects of an example communications device 1300. In some aspects, communications device 1300 is an RX UE, such as UE 104 described above with respect to FIGS. 1 and 3 and/or the first RX UE 806 described with respect to FIG. 8.

The communications device 1300 includes a processing system 1305 coupled to the transceiver 1365 (e.g., a transmitter and/or a receiver). The transceiver 1365 is configured to transmit and receive signals for the communications device 1300 via the antenna 1370, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1335 via a bus 1360. In certain aspects, the computer-readable medium/memory 1335 is configured to store instructions (e.g., computer-executable code) that when executed by the one or more processors 1310, cause the one or more processors 1310 to perform the method 1000 described with respect to FIG. 10, or any aspect related to it; and the method 1100 described with respect to FIG. 11, or any aspect related to it. Note that reference to a processor performing a function of communications device 1300 may include one or more processors 1310 performing that function of communications device 1300.

In the depicted example, computer-readable medium/memory 1335 stores code (e.g., executable instructions), such as code for receiving 1340, code for decoding 1345, code for transmitting 1350, and code for demodulating 1355. Processing of the code for receiving 1340, code for decoding 1345, code for transmitting 1350, and code for demodulating 1355 may cause the communications device 1300 to perform the method 1000 described with respect to FIG. 10, or any aspect related to it; and the method 1100 described with respect to FIG. 11, or any aspect related to it.

The one or more processors 1310 include circuitry configured to implement (e.g., execute) the code stored in the computer-readable medium/memory 1335, including circuitry such as circuitry for receiving 1315, circuitry for decoding 1320, circuitry for transmitting 1325, and circuitry for demodulating 1330. Processing with circuitry for receiving 1315, circuitry for decoding 1320, circuitry for transmitting 1325, and circuitry for demodulating 1330 may cause the communications device 1300 to perform the method 1000 described with respect to FIG. 10, or any aspect related to it; and the method 1100 described with respect to FIG. 11, or any aspect related to it.

Various components of the communications device 1300 may provide means for performing the method 1000 described with respect to FIG. 10, or any aspect related to it; and the method 1100 described with respect to FIG. 11, or any aspect related to it. For example, means for transmitting, sending or outputting for transmission may include transceivers 354 and/or antenna(s) 352 of the UE 104 illustrated in FIG. 3 and/or the transceiver 1365 and the antenna 1370 of the communications device 1300 in FIG. 13. Means for receiving or obtaining may include transceivers 354 and/or antenna(s) 352 of the UE 104 illustrated in FIG. 3 and/or the transceiver 1365 and the antenna 1370 of the communications device 1300 in FIG. 13.

Example Clauses

Implementation examples are described in the following numbered clauses:

Clause 1: A method for wireless communication by a transmitter user equipment (TX UE), comprising: determining, according to a sidelink resource allocation mode, a set of resources, in a resource pool of one or more resource pools associated with the sidelink resource allocation mode, to use for transmitting information to a group of receiver UEs (RX UEs); transmitting to the group of RX UEs an indication that the TX UE will transmit the information to the group of RX UEs using rate splitting multiple access (RSMA); transmitting the information to the group of RX UEs in the set of resources using RSMA, wherein transmitting the information to the group using RSMA comprises: combining control information for different RX UEs in the group of RX UEs into a common message; transmitting, in the set of resources, the common message including the combined control information to the group of RX UEs using a first precoder; and transmitting, in the set of resources, individual private data messages to each RX UE in the group of RX UEs using separate respective precoders different from the first precoder.

Clause 2: The method of Clause 1, wherein the combined control information included in the common message includes scheduling information scheduling the individual private data messages for each respective RX UE in the group of RX UEs.

Clause 3: The method of any one of Clauses 1-2, wherein the common message including the combined control information comprises one of a downlink control information (DCI) message, a sidelink control information (SCI) message, a second stage SCI message, or a first stage SCI message and a second stage SCI message.

Clause 4: The method of any one of Clauses 1-3, wherein: the sidelink resource allocation mode comprises sidelink resource allocation mode 1; and determining the set of resources is based on an indication received from a network entity.

Clause 5: The method of any one of Clauses 1-4, wherein: the sidelink resource allocation mode comprises sidelink resource allocation mode 2; and determining the set of resources comprises selecting the set of resources based on a channel sensing.

Clause 6: The method of any one of Clauses 1-5, wherein the indication that the TX UE will transmit the information to the group of RX UEs is based on at least one of: a priority associated with the information for transmission to the group of RX UEs; a remaining PDB associated with the information for transmission to the group of RX UEs; a quality of service (QoS) associated with the information for transmission to the group of RX UEs; or one or more channel state information (CSI) reports received from one or more RX UEs in the group of RX UEs.

Clause 7: The method of any one of Clauses 1-6, further comprising receiving configuration information from a network entity indicating whether RSMA is enabled or disabled for the sidelink resource allocation mode.

Clause 8: The method of Clause 7, wherein: when the configuration information indicates that RSMA is enabled, all resource pools in the one or more resource pools associated with the sidelink resource allocation mode are configured for RSMA; and when the configuration information indicates that RSMA is disabled, all resource pools in the one or more resource pools associated with the sidelink resource allocation mode are not configured for RSMA.

Clause 9: The method of Clause 7, wherein when the configuration information indicates that RSMA is enabled, a first set of resource pools in the one or more resource pools are configured for RSMA and a second set of resource pools in the one or more resource pools are not configured for RSMA.

Clause 10: The method of any one of Clauses 1-9, wherein determining the set of resources to use for transmitting information to a group of RX UEs is based on control information, received from a network entity, comprising a scheduling grant indicating the set of resources.

Clause 11: The method of Clause 10, further comprising receiving a downlink control information (DCI) message indicating whether the set of resources indicated in the scheduling grant are configured for RSMA, are not configured for RSMA, or that some resources in the set of resource are configured for both RSMA and that some resources in the set of resources are not configured for RSMA.

Clause 12: The method of Clause 10, wherein: the set of resources are reserved within a time period in which RSMA is enabled; and transmitting the indication that the TX UE will transmit the information to the group of RX UEs using RSMA is based on the reservation of the set of resources within the time period in which RSMA is enabled.

Clause 13: The method of any one of Clauses 1-12, further comprising receiving configuration information indicating, for each respective resource pool of the one or more resource pools, whether RSMA is enabled or disabled for that respective resource pool or whether some resources in that respective resource pool are configured for RSMA and some resources in that respective resource pool are not configured for RSMA.

Clause 14: The method of any one of Clauses 1-13, further comprising receiving configuration information indicating at least one of a maximum number of layers for transmitting the common message or a maximum number of layers for transmitting the individual private data messages.

Clause 15: The method of Clause 14, wherein the at least one of the maximum number of layers for transmitting the common message or the maximum number of layers for transmitting the individual private data messages is indicated per resource pool of the one or more resource pools or per resource grant.

Clause 16: The method of Clause 14, further comprising: determining a first number of layers for transmitting the common message based on the maximum number of layers for transmitting the common message; and determining a second number of layers for transmitting the individual private data messages based on the maximum number of layers for transmitting the individual private data messages.

Clause 17: The method of Clause 16, further comprising receiving individual capability information from one or more RX UEs in the group of RX UEs, wherein determining the first number of layers and determining the second number of layers is based further on the individual capability information received from the one or more RX UEs in the group of RX UEs.

Clause 18: The method of any one of Clauses 1-17, wherein the sidelink resource allocation mode comprises a sidelink resource allocation mode 1 in which the set of resources are allocated by a network entity.

Clause 19: The method of Clause 18, further comprising: receiving downlink control information (DCI), received from a network entity, comprising a scheduling grant indicating the set of resources; and transmitting an indication of the set of resources to the group of RX UEs indicating, for the common message and for the individual private data messages, at least one of a respective time domain resource allocation, a respective frequency domain resource allocation, a respective modulation and coding scheme (MCS), a respective demodulation reference signal (DMRS) identifier, a respective number of ports to be used for transmission, or a respective redundancy version.

Clause 20: The method of Clause 19, wherein transmitting the indication of the set of resources comprises transmitting the indication of the set of resources in at least one of a first stage sidelink control information (SCI-1) message or a second stage sidelink control information message (SCI-2).

Clause 21: The method of any one of Clauses 1-20, wherein the sidelink resource allocation mode comprises a sidelink resource allocation mode 2 in which the set of resources are determined without assistance from a network entity.

Clause 22: The method of Clause 21, further comprising transmitting an indication of the set of resources to the group of RX UEs indicating, for the common message and for the individual private data messages, at least one of a respective time domain resource allocation, a respective frequency domain resource allocation, a respective modulation and coding scheme (MCS), a respective demodulation reference signal (DMRS) identifier, a respective number of ports to be used for transmission, or a respective redundancy version.

Clause 23: The method of Clause 22, wherein transmitting the indication of the set of resources comprises transmitting the indication of the set of resources in at least one of a first stage sidelink control information (SCI-1) message or a second stage sidelink control information message (SCI-2).

Clause 24: The method of any one of Clauses 1-23, further comprising: transmitting a first demodulation reference signal (DMRS) associated with the common message based on a first DMRS identifier (ID); and transmitting a second DMRS associated with at least one of the individual private data messages based on a second DMRS ID.

Clause 25: The method of Clause 24, wherein the first DMRS ID associated with the common message is different from at least the second DMRS ID associated with the at least one of the individual private data messages.

Clause 26: The method of Clause 24, further comprising receiving, from a network entity, a DMRS ID offset between the first DMRS ID and the second DMRS ID, wherein the DMRS ID offset is indicated per resource pool of the one or more resource pools.

Clause 27: The method of Clause 24, further comprising determining at least one of the first DMRS ID or the second DMRS based on one or more tables that define a relative relationship between the first DMRS ID and the second DMRS ID.

Clause 28: The method of Clause 24, further comprising receiving a plurality of DMRS IDs in a media access control-control element (MAC-CE) from a network entity.

Clause 29: The method of Clause 28, further receiving downlink control information (DCI), received from a network entity, comprising a scheduling grant indicating the set of resources, wherein the DCI indicates at least one of the first DMRS ID or the second DMRSs from the plurality of DMRS IDs.

Clause 30: The method of Clause 28, further comprising: selecting the first DMRS ID and the second DMRS ID from the plurality of DMRS IDs; and transmitting sidelink control information to at least one of the RX UEs in the group of RX UEs indicating the first DMRS ID associated with the common message and the second DMRS ID associated with the at least one of the individual private data messages.

Clause 31: The method of Clause 24, further comprising: receiving configuration information for the first DMRS and the second DMRS from a network entity; selecting the first DMRS ID and the second DMRS ID based on the configuration information; and transmitting signaling to the group of RX UEs indicating the first DMRS ID and the second DMRS ID.

Clause 32: The method of Clause 31, wherein selecting the first DMRS ID and the second DMRS ID is based on at least one of stage 1 sidelink control information (SCI-1), second stage sidelink control information (SCI-2), layer 1 signaling, layer 2 signaling, or layer 3 signaling.

Clause 33: The method of any one of Clauses 1-32, further comprising receiving, from a first RX UE in the group of RX UEs, first feedback information associated with the common message and receiving second feedback information associated with a first individual private data message of the individual private data messages.

Clause 34: The method of Clause 33, wherein: the first feedback information and the second feedback information are transmitted using a single cyclic shift on a same resource block (RB); the single cyclic shift represents two bits; a first bit of the two bits indicates the first feedback information; and a second bit of the two bits indicates the second feedback information.

Clause 35: The method of Clause 33, wherein: the first feedback information is associated with a first cyclic shift; and the second feedback information is associated with a second cyclic shift different from the first cyclic shift.

Clause 36: The method of Clause 33, wherein: the first feedback information is received in a first physical resource block (PRB); and the second feedback information is received in a second PRB.

Clause 37: The method of Clause 36, wherein the first PRB is offset from the second PRB based on a configured offset.

Clause 38: The method of Clause 36, wherein at least one of: the first PRB is based on configuration information that indicates the first PRB based on a message type of the common message; or the second PRB is based on configuration information that indicates the second PRB based on a message type of the first individual private data message.

Clause 39: The method of Clause 33, wherein: the first feedback information and the second feedback information are received in a same physical resource block (PRB); the first feedback information is received with a first power level; and the second feedback information is received with a second power level different from the first power level.

Clause 40: The method of Clause 33, wherein: the first feedback information is received in a first physical sidelink feedback channel (PSFCH) occasion; and the second feedback information is received in a second PSFCH occasion different from the first PSFCH occasion.

Clause 41: The method of Clause 40, wherein: a first offset between reception of the common message and the first PSFCH occasion is based on a message type associated with the common message; and a second offset between reception of the first individual private data message and the second PSFCH occasion is based on a message type associated with the first individual private data message.

Clause 42: The method of Clause 33, wherein: the first feedback information is received in a first set of physical resource block (PRB) configured for feedback information for common messages; and the second feedback information is received in a second set of PRBs configured for feedback information for the individual private data messages.

Clause 43: The method of Clause 33, wherein: the first feedback information associated with the common message is received based on a first physical sidelink shared channel (PSSCH)-to-physical sidelink feedback channel (PSFCH) time gap configured for transmitting feedback information for the common message; and the second feedback information associated with the common message is received based on a second PSSCH-to-PSFCH time gap configured for transmitting feedback information for the individual private data messages.

Clause 44: The method of Clause 43, wherein the first PSSCH-to-PSFCH time gap and the second PSSCH-to-PSFCH time gap are configured per resource pool of the one or more resource pools.

Clause 45: A method for wireless communications by a first receiver (RX) user equipment (UE), comprising: receiving, from a transmitter (TX) UE, an indication that the TX UE will transmit information to a group of RX UEs, including the first RX UE, using rate splitting multiple access (RSMA); receiving, in a set of resources in a resource pool of one or more resource pools associated with a sidelink resource allocation mode, the information from the TX UE using RSMA, wherein receiving the information comprises: receiving, in the set of resources, a common message including combined control information for individual RX UEs, including the first RX UE, in the group of RX UEs, and receiving, in the set of resources, at least one individual private data message intended for the first RX UE; decoding the common message using a first decoder; and decoding the at least one individual private data message using a second decoder.

Clause 46: The method of Clause 45, wherein decoding the at least one individual private data message is based on results of decoding the common message.

Clause 47: The method of any one of Clauses 45-46, wherein the combined control information included in the common message includes scheduling information scheduling the at least one individual private data message.

Clause 48: The method of any one of Clauses 45-47, wherein the common message including the combined control information comprises one of a downlink control information (DCI) message, a sidelink control information (SCI) message, a second stage SCI message, or a first stage SCI message and a second stage SCI message.

Clause 49: The method of any one of Clauses 45-48, wherein the indication that the TX UE will transmit the information to the group of RX UEs is based on at least one of: a priority associated with the information for transmission to the group of RX UEs; a remaining PDB associated with the information for transmission to the group of RX UEs; a quality of service (QoS) associated with the information for transmission to the group of RX UEs; or one or more channel state information (CSI) reports associated with the first RX UE.

Clause 50: The method of any one of Clauses 45-49, wherein: when RSMA is enabled, all resource pools in the one or more resource pools associated with the sidelink resource allocation mode are configured for RSMA; and when RSMA is disabled, all resource pools in the one or more resource pools associated with the sidelink resource allocation mode are not configured for RSMA.

Clause 51: The method of any one of Clauses 45-50, wherein when RSMA is enabled, a first set of resource pools in the one or more resource pools are configured for RSMA and a second set of resource pools in the one or more resource pools are not configured for RSMA.

Clause 52: The method of any one of Clauses 45-51, wherein: the set of resources are reserved within a time period in which RSMA is enabled; and receiving the indication that the TX UE will transmit the information to the group of RX UEs using RSMA is based on the reservation of the set of resources within the time period in which RSMA is enabled.

Clause 53: The method of any one of Clauses 45-52, wherein: the common message is transmitted using a first number of layers; and the at least one individual private data message is transmitted using a second number of layers; and at least one of the first number of layers or the second number of layers is based on individual capability information of the first RX UE.

Clause 54: The method of Clause 53, further comprising transmitting the individual capability information of the first RX UE to the TX UE.

Clause 55: The method of any one of Clauses 45-54, wherein the sidelink resource allocation mode comprises a sidelink resource allocation mode 1 in which the set of resources are allocated by a network entity.

Clause 56: The method of Clause 55, further comprising receiving an indication of the set of resources from the TX UE indicating, for the common message and for the at least one individual private data message, at least one of a respective time domain resource allocation, a respective frequency domain resource allocation, a respective modulation and coding scheme (MCS), a respective demodulation reference signal (DMRS) identifier, a respective number of ports to be used for transmission, or a respective redundancy version.

Clause 57: The method of Clause 56, wherein receiving the indication of the set of resources comprises receiving the indication of the set of resources in at least one of a first stage sidelink control information (SCI-1) message or a second stage sidelink control information message (SCI-2).

Clause 58: The method of any one of Clauses 45-57, wherein the sidelink resource allocation mode comprises a sidelink resource allocation mode 2 in which the set of resources are determined at the TX UE without assistance from a network entity.

Clause 59: The method of Clause 58, further comprising receiving an indication of the set of resources from the TX UE indicating, for the common message and for the at least one individual private data message, at least one of a respective time domain resource allocation, a respective frequency domain resource allocation, a respective modulation and coding scheme (MCS), a respective demodulation reference signal (DMRS) identifier, a respective number of ports to be used for transmission, or a respective redundancy version.

Clause 60: The method of Clause 59, wherein receiving the indication of the set of resources comprises receiving the indication of the set of resources in at least one of a first stage sidelink control information (SCI-1) message or a second stage sidelink control information message (SCI-2).

Clause 61: The method of any one of Clauses 45-60, further comprising: receiving a first demodulation reference signal (DMRS) associated with the common message based on a first DMRS identifier (ID); and receiving a second DMRS associated with at least one of the at least one individual private data message based on a second DMRS ID.

Clause 62: The method of Clause 61, further comprising demodulating the common message based on the first DMRS and demodulating the at least one individual private data message based on the second DMRS.

Clause 63: The method of Clause 62, wherein the first DMRS ID and the second DMRS ID are based on a DMRS ID offset configured per resource pool of the one or more resource pools.

Clause 64: The method of Clause 61, wherein a first DMRS identifier (ID) associated with the common message is different from at least a second DMRS ID associated with the at least one of the individual private data messages.

Clause 65: The method of Clause 61, further comprising receiving sidelink control information from the TX UE indicating the first DMRS ID associated with the common message and the second DMRS ID associated with the at least one individual private data message.

Clause 66: The method of any one of Clauses 45-65, further comprising transmitting, to the TX UE, first feedback information associated with the common message and transmitting second feedback information associated with the at least one individual private data message.

Clause 67: The method of Clause 66, wherein: the first feedback information and the second feedback information are transmitted using a single cyclic shift on a same resource block (RB); the single cyclic shift represents two bits; a first bit of the two bits indicates the first feedback information; and a second bit of the two bits indicates the second feedback information.

Clause 68: The method of Clause 66, wherein: the first feedback information is associated with a first cyclic shift; and the second feedback information is associated with a second cyclic shift different from the first cyclic shift.

Clause 69: The method of Clause 66, wherein: the first feedback information is transmitted in a first physical resource block (PRB); and the second feedback information is transmitted in a second PRB.

Clause 70: The method of Clause 69, wherein the first PRB is offset from the second PRB based on a configured offset.

Clause 71: The method of Clause 69, wherein at least one of: the first PRB is based on configuration information that indicates the first PRB based on a message type of the common message; or the second PRB is based on configuration information that indicates the second PRB based on a message type of the at least one individual private data message.

Clause 72: The method of Clause 66, wherein: the first feedback information and the second feedback information are transmitted in a same physical resource block (PRB); the first feedback information is transmitted with a first power level; and the second feedback information is transmitted with a second power level different from the first power level.

Clause 73: The method of Clause 66, wherein: the first feedback information is transmitted in a first physical sidelink feedback channel (PSFCH) occasion; and the second feedback information is transmitted in a second PSFCH occasion different from the first PSFCH occasion.

Clause 74: The method of Clause 73, wherein: a first offset between reception of the common message and the first PSFCH occasion is based on a message type associated with the common message; and a second offset between reception of the at least one individual private data message and the second PSFCH occasion is based on a message type associated with the at least one individual private data message.

Clause 75: The method of Clause 66, wherein: the first feedback information is transmitted in a first set of physical resource block (PRB) configured for feedback information for common messages; and the second feedback information is transmitted in a second set of PRBs configured for feedback information for the individual private data messages.

Clause 76: The method of Clause 66, wherein: the first feedback information associated with the common message is transmitted based on a first physical sidelink shared channel (PSSCH)-to-physical sidelink feedback channel (PSFCH) time gap configured for transmitting feedback information for the common message; and the second feedback information associated with the common message is transmitted based on a second PSSCH-to-PSFCH time gap configured for transmitting feedback information for the individual private data messages.

Clause 77: The method of Clause 76, wherein the first PSSCH-to-PSFCH time gap and the second PSSCH-to-PSFCH time gap are configured per resource pool of the one or more resource pools.

Clause 78: An apparatus, comprising: a memory comprising executable instructions; and a processor configured to execute the executable instructions and cause the apparatus to perform a method in accordance with any one of Clauses 1-77.

Clause 79: An apparatus, comprising means for performing a method in accordance with any one of Clauses 1-77.

Clause 80: A non-transitory computer-readable medium comprising executable instructions that, when executed by a processor of an apparatus, cause the apparatus to perform a method in accordance with any one of Clauses 1-77.

Clause 81: A computer program product embodied on a computer-readable storage medium comprising code for performing a method in accordance with any one of Clauses 1-77.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a transmitter user equipment (TX UE), comprising:
   determining, according to a sidelink resource allocation mode, a set of resources, in a resource pool of one or more resource pools associated with the sidelink resource allocation mode, to use for transmitting information to a group of receiver UEs (RX UEs);
   transmitting to the group of RX UEs an indication that the TX UE will transmit the information to the group of RX UEs using rate splitting multiple access (RSMA); and
   transmitting the information to the group of RX UEs in the set of resources using RSMA, wherein transmitting the information to the group using RSMA comprises:
      combining control information for different RX UEs in the group of RX UEs into a common message;
      transmitting, in the set of resources, the common message including the combined control information to the group of RX UEs using a first precoder; and
      transmitting, in the set of resources, individual private data messages to each RX UE in the group of RX UEs using separate respective precoders different from the first precoder.

2. The method of claim 1, wherein the indication that the TX UE will transmit the information to the group of RX UEs is based on at least one of:
   a priority associated with the information for transmission to the group of RX UEs;
   a remaining PDB associated with the information for transmission to the group of RX UEs;
   a quality of service (QoS) associated with the information for transmission to the group of RX UEs; or
   one or more channel state information (CSI) reports received from one or more RX UEs in the group of RX UEs.

3. The method of claim 1, wherein:
   determining the set of resources to use for transmitting information to a group of RX UEs is based on control information, received from a network entity, comprising a scheduling grant indicating the set of resources;
   the set of resources are reserved within a time period in which RSMA is enabled; and
   transmitting the indication that the TX UE will transmit the information to the group of RX UEs using RSMA is based on the reservation of the set of resources within the time period in which RSMA is enabled.

4. The method of claim 1, wherein:
   the sidelink resource allocation mode comprises a sidelink resource allocation mode 1 in which the set of resources are allocated by a network entity; and
   the method further comprises:
      receiving downlink control information (DCI), received from a network entity, comprising a scheduling grant indicating the set of resources; and
      transmitting an indication of the set of resources to the group of RX UEs indicating, for the common message and for the individual private data messages, at least one of:
         a respective time domain resource allocation;
         a respective frequency domain resource allocation;
         a respective modulation and coding scheme (MCS);

a respective demodulation reference signal (DMRS) identifier;
a respective number of ports to be used for transmission; or
a respective redundancy version.

5. The method of claim 1, wherein:
the sidelink resource allocation mode comprises a sidelink resource allocation mode 2 in which the set of resources are determined without assistance from a network entity; and
the method further comprises:
transmitting an indication of the set of resources to the group of RX UEs indicating, for the common message and for the individual private data messages, at least one of:
a respective time domain resource allocation;
a respective frequency domain resource allocation;
a respective modulation and coding scheme (MCS);
a respective demodulation reference signal (DMRS) identifier;
a respective number of ports to be used for transmission; or
a respective redundancy version.

6. The method of claim 1, further comprising:
transmitting a first a first demodulation reference signal (DMRS) associated with the common message based on a first DMRS identifier (ID);
transmitting a second DMRS associated with at least one of the individual private data messages based on a second DMRS ID, wherein the first DMRS associated with the common message is different from at least the second DMRS ID associated with the at least one of the individual private data messages; and
transmitting sidelink control information to at least one of the RX UEs in the group of RX UEs indicating the first DMRS ID associated with the common message and the second DMRS ID associated with the at least one of the individual private data messages.

7. The method of claim 6, further comprising at least one of:
receiving, from a network entity, a DMRS ID offset between the first DMRS ID and the second DMRS ID, wherein the DMRS ID offset is indicated per resource pool of the one or more resource pools; or
determining at least one of the first DMRS ID or the second DMRS based on one or more tables that define a relative relationship between the first DMRS ID and the second DMRS ID.

8. The method of claim 6, further comprising:
receiving a plurality of DMRS IDs in a media access control-control element (MAC-CE) from a network entity; and
one of:
receiving downlink control information (DCI), received from a network entity, comprising a scheduling grant indicating the set of resources, wherein the DCI indicates at least one of the first DMRS ID or the second DMRSs from the plurality of DMRS IDs; or
selecting the first DMRS ID and the second DMRS ID from the plurality of DMRS IDs.

9. The method of claim 1, further comprising receiving, from a first RX UE in the group of RX UEs, first feedback information associated with the common message and receiving second feedback information associated with a first individual private data message of the individual private data messages.

10. The method of claim 9, wherein one of:
the first feedback information is associated with a first cyclic shift and the second feedback information is associated with a second cyclic shift different from the first cyclic shift; or
the first feedback information and the second feedback information are transmitted using a single cyclic shift on a same resource block (RB), wherein:
the single cyclic shift represents two bits;
a first bit of the two bits indicates the first feedback information; and
a second bit of the two bits indicates the second feedback information.

11. The method of claim 9, wherein:
the first feedback information is received in a first physical resource block (PRB);
the second feedback information is received in a second PRB; and
the first PRB is offset from the second PRB based on a configured offset.

12. The method of claim 9, wherein:
the first feedback information and the second feedback information are received in a same physical resource block (PRB);
the first feedback information is received with a first power level; and
the second feedback information is received with a second power level different from the first power level.

13. The method of claim 9, wherein:
the first feedback information is received in a first physical sidelink feedback channel (PSFCH) occasion;
the second feedback information is received in a second PSFCH occasion different from the first PSFCH occasion;
a first offset between reception of the common message and the first PSFCH occasion is based on a message type associated with the common message; and
a second offset between reception of the first individual private data message and the second PSFCH occasion is based on a message type associated with the first individual private data message.

14. The method of claim 9, wherein:
the first feedback information associated with the common message is received based on a first physical sidelink shared channel (PSSCH)-to-physical sidelink feedback channel (PSFCH) time gap configured for transmitting feedback information for the common message;
the second feedback information associated with the common message is received based on a second PSSCH-to-PSFCH time gap configured for transmitting feedback information for the individual private data messages; and
the first PSSCH-to-PSFCH time gap and the second PSSCH-to-PSFCH time gap are configured per resource pool of the one or more resource pools.

15. A method for wireless communications by a first receiver user equipment (RX UE), comprising:
receiving, from a transmitter (TX) UE, an indication that the TX UE will transmit information to a group of RX UEs, including the first RX UE, using rate splitting multiple access (RSMA);
receiving, in a set of resources in a resource pool of one or more resource pools associated with a sidelink resource allocation mode, the information from the TX UE using RSMA, wherein receiving the information comprises:

receiving, in the set of resources, a common message including combined control information for individual RX UEs, including the first RX UE, in the group of RX UEs; and
receiving, in the set of resources, at least one individual private data message intended for the first RX UE;
decoding the common message using a first decoder; and
decoding the at least one individual private data message using a second decoder.

16. The method of claim 15, wherein decoding the at least one individual private data message is based on results of decoding the common message.

17. The method of claim 15, wherein the indication that the TX UE will transmit the information to the group of RX UEs is based on at least one of:
a priority associated with the information for transmission to the group of RX UEs;
a remaining PDB associated with the information for transmission to the group of RX UEs;
a quality of service (QoS) associated with the information for transmission to the group of RX UEs; or
one or more channel state information (CSI) reports associated with the first RX UE.

18. The method of claim 15, wherein:
the set of resources are reserved within a time period in which RSMA is enabled; and
receiving the indication that the TX UE will transmit the information to the group of RX UEs using RSMA is based on the reservation of the set of resources within the time period in which RSMA is enabled.

19. The method of claim 15, wherein:
the sidelink resource allocation mode comprises a sidelink resource allocation mode 1 in which the set of resources are allocated by a network entity; and
the method further comprises receiving an indication of the set of resources from the TX UE indicating, for the common message and for the at least one individual private data message, at least one of:
a respective time domain resource allocation;
a respective frequency domain resource allocation;
a respective modulation and coding scheme (MCS);
a respective demodulation reference signal (DMRS) identifier;
a respective number of ports to be used for transmission; or
a respective redundancy version.

20. The method of claim 15, wherein:
the sidelink resource allocation mode comprises a sidelink resource allocation mode 2 in which the set of resources are determined at the TX UE without assistance from a network entity; and
the method further comprises receiving an indication of the set of resources from the TX UE indicating, for the common message and for the at least one individual private data message, at least one of:
a respective time domain resource allocation;
a respective frequency domain resource allocation;
a respective modulation and coding scheme (MCS);
a respective demodulation reference signal (DMRS) identifier;
a respective number of ports to be used for transmission; or
a respective redundancy version.

21. The method of claim 15, further comprising:
receiving sidelink control information from the TX UE indicating a first demodulation reference signal (DMRS) identifier (ID) associated with the common message and a second DMRS ID associated with the at least one individual private data message
receiving a first DMRS associated with the common message based on the first DMRS ID; and
receiving a second DMRS associated with at least one of the at least one individual private data message based on a second DMRS ID, wherein:
the first DMRS ID associated with the common message is different from at least the second DMRS ID associated with the at least one of the individual private data messages; and
the first DMRS ID and the second DMRS ID are based on a DMRS ID offset configured per resource pool of the one or more resource pools.

22. The method of claim 21, further comprising demodulating the common message based on the first DMRS and demodulating the at least one individual private data message based on the second DMRS.

23. The method of claim 15, further comprising transmitting, to the TX UE, first feedback information associated with the common message and transmitting second feedback information associated with the at least one individual private data message.

24. The method of claim 23, wherein one of:
the first feedback information is associated with a first cyclic shift and the second feedback information is associated with a second cyclic shift different from the first cyclic shift; or
the first feedback information and the second feedback information are transmitted using a single cyclic shift on a same resource block (RB), wherein:
the single cyclic shift represents two bits;
a first bit of the two bits indicates the first feedback information; and
a second bit of the two bits indicates the second feedback information.

25. The method of claim 23, wherein:
the first feedback information is transmitted in a first physical resource block (PRB);
the second feedback information is transmitted in a second PRB; and
the first PRB is offset from the second PRB based on a configured offset.

26. The method of claim 23, wherein:
the first feedback information and the second feedback information are transmitted in a same physical resource block (PRB);
the first feedback information is transmitted with a first power level; and
the second feedback information is transmitted with a second power level different from the first power level.

27. The method of claim 23, wherein:
the first feedback information is transmitted in a first physical sidelink feedback channel (PSFCH) occasion;
the second feedback information is transmitted in a second PSFCH occasion different from the first PSFCH occasion;
a first offset between reception of the common message and the first PSFCH occasion is based on a message type associated with the common message; and
a second offset between reception of the at least one individual private data message and the second PSFCH occasion is based on a message type associated with the at least one individual private data message.

28. The method of claim 23, wherein:
the first feedback information associated with the common message is transmitted based on a first physical sidelink shared channel (PSSCH)-to-physical sidelink feedback channel (PSFCH) time gap configured for transmitting feedback information for the common message;

the second feedback information associated with the common message is transmitted based on a second PSSCH-to-PSFCH time gap configured for transmitting feedback information for the individual private data messages; and the first PSSCH-to-PSFCH time gap and the second PSSCH-to-PSFCH time gap are configured per resource pool of the one or more resource pools.

29. A transmitter user equipment (TX UE), comprising:

a memory comprising executable instructions; and a processor configured to execute the executable instructions and cause the TX UE to:

determine, according to a sidelink resource allocation mode, a set of resources, in a resource pool of one or more resource pools associated with the sidelink resource allocation mode, to use for transmitting information to a group of receiver UEs (RX UEs);

transmit to the group of RX UEs an indication that the TX UE will transmit the information to the group of RX UEs using rate splitting multiple access (RSMA); and transmit the information to the group of RX UEs in the set of resources using RSMA, wherein, in order to transmit the information to the group using RSMA, the processor is configured to cause the TX UE to:

combine control information for different RX UEs in the group of RX UEs into a common message;

transmit, in the set of resources, the common message including the combined control information to the group of RX UEs using a first precoder; and transmit, in the set of resources, individual private data messages to each RX UE in the group of RX UEs using separate respective precoders different from the first precoder.

30. A receiver user equipment (RX UE), comprising:

a memory comprising executable instructions; and a processor configured to execute the executable instructions and cause the RX UE to:

receive, from a transmitter (TX) UE, an indication that the TX UE will transmit information to a group of RX UEs, including the first RX UE, using rate splitting multiple access (RSMA);

receive, in a set of resources in a resource pool of one or more resource pools associated with a sidelink resource allocation mode, the information from the TX UE using RSMA, wherein, in order to receive the information, the processor is further configured to cause the RX UE to:

receive, in the set of resources, a common message including combined control information for individual RX UEs, including the first RX UE, in the group of RX UEs; and receive, in the set of resources, at least one individual private data message intended for the first RX UE;

decode the common message using a first decoder; and decode the at least one individual private data message using a second decoder.

* * * * *